United States Patent
Narayanam et al.

(10) Patent No.: US 11,387,979 B2
(45) Date of Patent: Jul. 12, 2022

(54) PARTIALLY-ORDERED BLOCKCHAIN

(71) Applicant: International Business Machines Corporation, Armonk, NY (US)

(72) Inventors: Krishnasuri Narayanam, Bangalore (IN); Ken Kumar, Meerut (IN); Pankaj S. Dayama, Bangalore (IN); Akshar Kaul, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 16/726,198

(22) Filed: Dec. 23, 2019

(65) Prior Publication Data

US 2021/0194672 A1 Jun. 24, 2021

(51) Int. Cl.
| | |
|---|---|
| *G06F 21/00* | (2013.01) |
| *H04L 9/06* | (2006.01) |
| *G06F 9/4401* | (2018.01) |
| *G06F 11/14* | (2006.01) |
| *H04L 9/00* | (2022.01) |

(52) U.S. Cl.
CPC .......... *H04L 9/0637* (2013.01); *G06F 9/4418* (2013.01); *G06F 11/1464* (2013.01); *H04L 9/50* (2022.05)

(58) Field of Classification Search
CPC .............. H04L 9/0637; H04L 2209/38; H04L 63/12; H04L 9/3239; G06F 9/4418; G06F 11/1464; G06F 3/0611; G06F 3/0659; G06F 3/067; G06F 21/645; G06F 11/2094

See application file for complete search history.

(56) References Cited

U.S. PATENT DOCUMENTS

| | | | |
|---|---|---|---|
| 10,255,108 B2 | 4/2019 | Dillenberger et al. | |
| 11,216,874 B2* | 1/2022 | James | .................... G06Q 40/04 |
| 11,223,487 B2* | 1/2022 | Weng | .................... H04L 9/3239 |
| 2016/0374442 A1* | 12/2016 | Zhang | .................. A45C 11/182 |
| | | | 150/147 |
| 2018/0025181 A1 | 1/2018 | Barinov et al. | |
| 2018/0158034 A1 | 6/2018 | Hunt et al. | |
| 2018/0323974 A1 | 11/2018 | Gao et al. | |

(Continued)

FOREIGN PATENT DOCUMENTS

| | | |
|---|---|---|
| CN | 106530088 A | 3/2017 |
| CN | 108990002 A | 12/2018 |

(Continued)

OTHER PUBLICATIONS

International Search Report issued in the corresponding International Application No. PCT/IB2020/062961, dated Mar. 23, 2021.

(Continued)

*Primary Examiner* — Mahfuzur Rahman

(57) ABSTRACT

An example operation may include one or more of receiving blocks of a blockchain from one or more of a neighboring blockchain peer and an ordering service node, identifying two or more blocks from among the received blocks that belong to a same slot within the blockchain, validating the two or more identified blocks in parallel via execution of the two or more identified blocks at a same time, and in response to validation of the two or more identified blocks, storing the two or more identified blocks on a local blockchain ledger of a blockchain peer.

18 Claims, 24 Drawing Sheets

(56) References Cited

U.S. PATENT DOCUMENTS

| | | | | |
|---|---|---|---|---|
| 2019/0087446 A1* | 3/2019 | Sharma | ............... | G06F 16/9024 |
| 2019/0236598 A1* | 8/2019 | Padmanabhan | .......... | G06N 3/08 |
| 2020/0074456 A1* | 3/2020 | Coleman | .............. | G06Q 20/382 |
| 2020/0074457 A1* | 3/2020 | Coleman | ............ | G06Q 20/0655 |
| 2020/0259633 A1* | 8/2020 | Gallagher-Lynch | ......................... H04L 9/0637 | |
| 2021/0194672 A1* | 6/2021 | Narayanam | ........... | G06F 21/645 |
| 2022/0029822 A1* | 1/2022 | Ubbens | ................. | G06F 21/602 |

FOREIGN PATENT DOCUMENTS

| | | |
|---|---|---|
| CN | 109242681 A | 1/2019 |
| EP | 3468095 A1 | 4/2019 |
| WO | 2019072305 A2 | 4/2019 |

OTHER PUBLICATIONS

Amiri et al., "ParBlockchain: Leveraging Transaction Parallelism in Permissioned Blockchain Systems." arXiv preprint arXiv:1902.01457 , Feb. 4, 2019.

Bartoletti et al., "A true concurrent model of smart contracts executions." arXiv preprint arXiv:1905.04366, May 10, 2019.

Dubey et al. "Weaver: a high-performance, transactional graph database based on refinable timestamps." Proceedings of the VLDB Endowment 9.11 (2016): 852-863, Jun. 20, 2016.

Ge et al., . "A Dataflow Blockchain Platform." Whitepaper—Version 1.0, May 9, 2018.

Maiyya et al. "Database and Distributed Computing Foundations of Blockchains." Proceedings of the 2019 International Conference on Management of Data. ACM, Jun. 30-Jul. 5, 2019.

\* cited by examiner

100

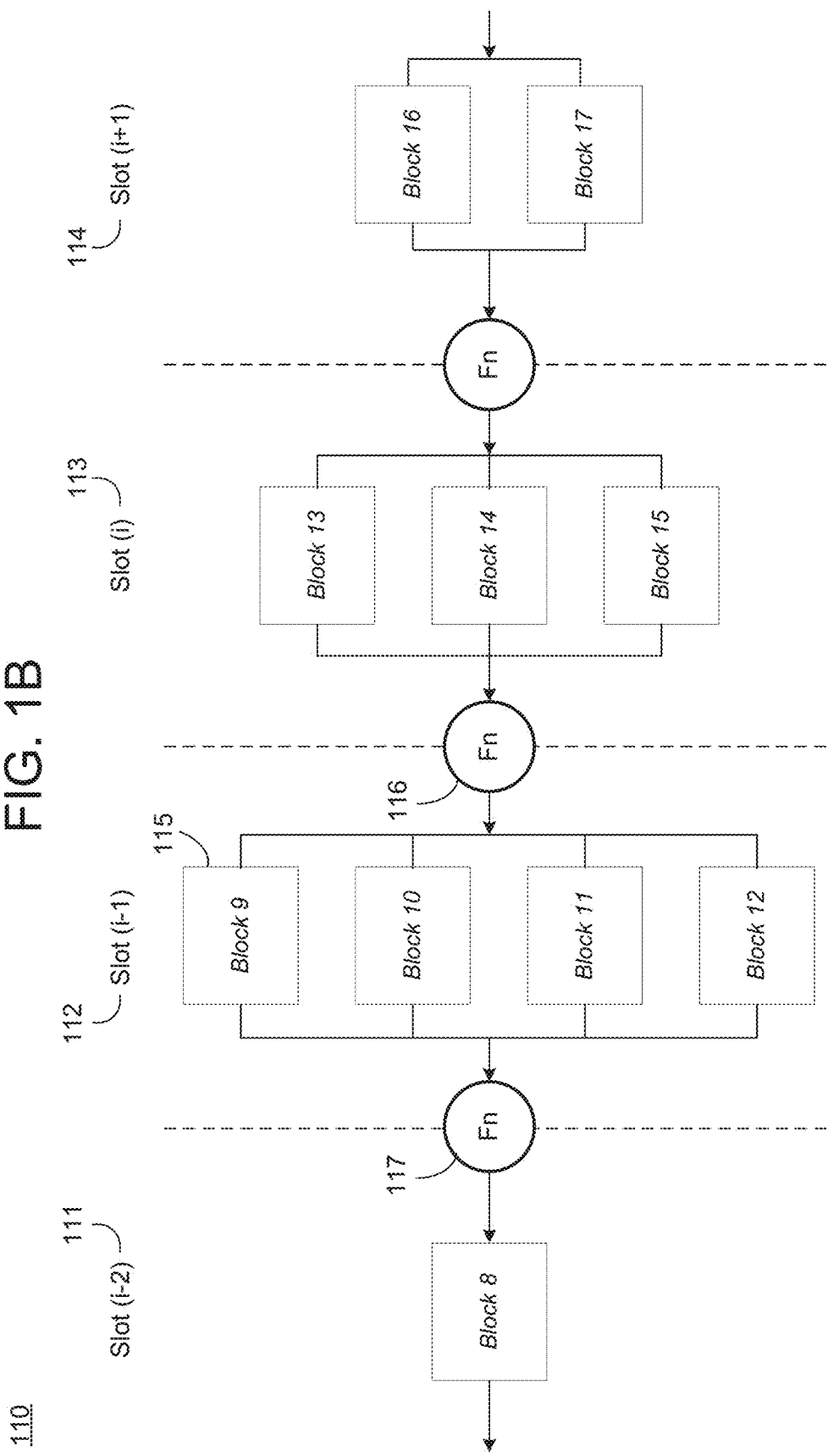

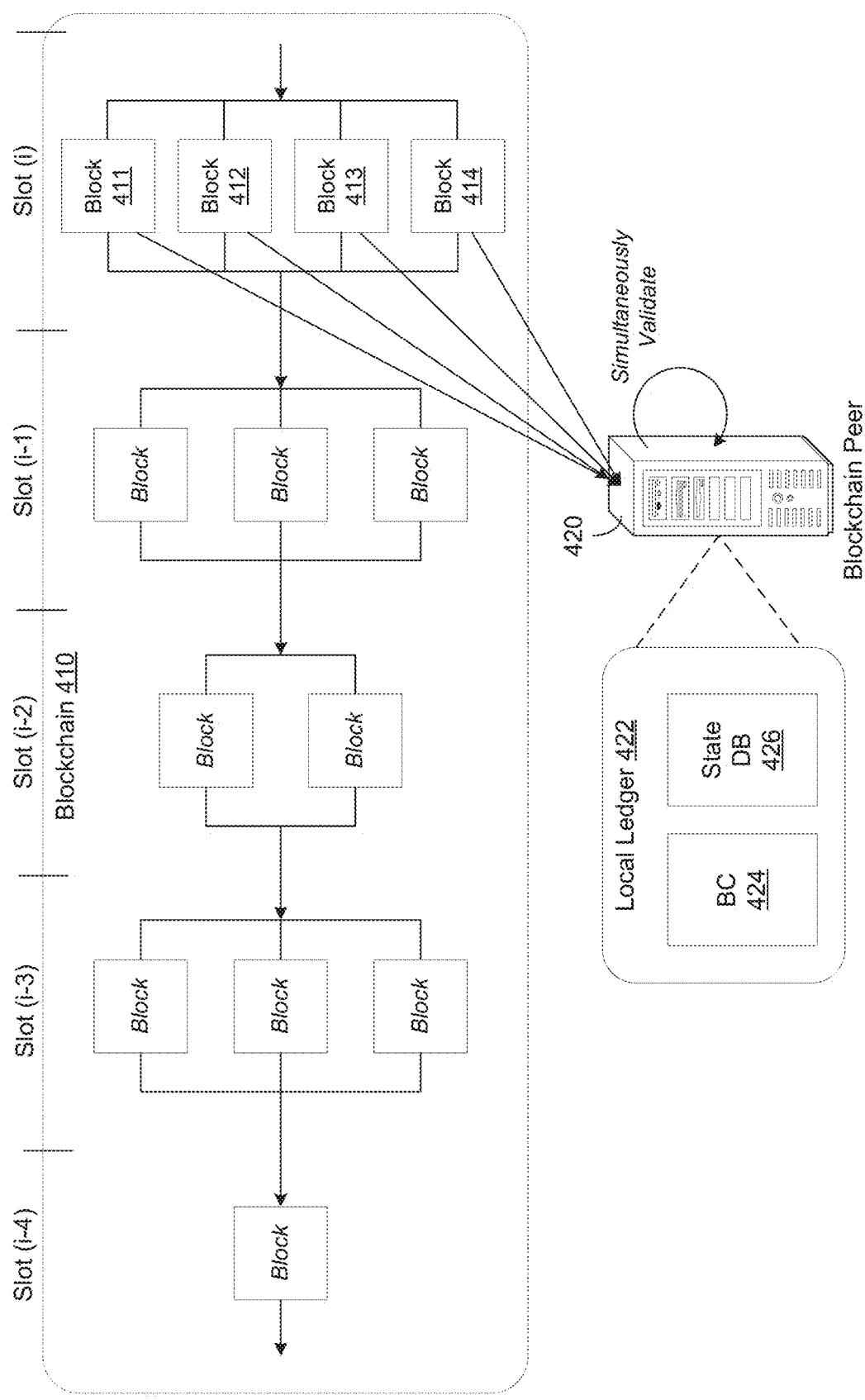

800

PARTIALLY-ORDERED BLOCKCHAIN

TECHNICAL FIELD

This application generally relates to storing data on a blockchain, and more particularly, to a blockchain ledger in which non-dependent blocks are ordered in slots instead of in a linear sequence thereby enabling improved data access to block data.

BACKGROUND

A centralized database stores and maintains data in a single database (e.g., a database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure if there are no fault-tolerance considerations. Therefore, if a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database.

Organizations are recently turning to blockchain as a means for securely storing data in a way that is not restricted by a central entity and that is accessible from multiple points. In a blockchain network, peers are responsible for collectively managing and storing data on the blockchain. Blockchain offers data redundancy, no central authority, multiple nodes of access, and the like. A traditional blockchain stores data blocks in a linear sequence of blocks where each block is hash-linked to an immediately previous block, and so on. The link is the result of the block storing a hash of the immediately previous block. These links create a sequential chain of blocks, referred to as the blockchain.

Validation (sometimes referred to as consensus protocol) is a fundamental aspect of blockchain because it ensures that a blockchain peer has a correct state of the blockchain. In a permissioned blockchain, a blockchain peer can validate the state of the blockchain by verifying the hash links between the blocks. This requires the blockchain peer to perform a hash validation of each link on the linear chain of blocks. Blockchains can grow to thousands or even millions of blocks. Therefore, the validation process can take considerable time and resources. As such, what is needed is a solution that overcomes these drawbacks and limitations.

SUMMARY

One example embodiment provides a system that includes one or more of a network interface configured to receive blocks of a blockchain from one or more of a neighboring blockchain peer and an ordering service node, and a processor configured to one or more of identify at least two blocks from among the received blocks that belong to a same slot within the blockchain, validate the at least two identified blocks in parallel via execution of the at least two identified blocks at a same time, and in response to validation of the at least two identified blocks, store the at least two identified blocks on a local blockchain ledger of a blockchain peer.

Another example embodiment provides a method that includes one or more of receiving blocks of a blockchain from one or more of a neighboring blockchain peer and an ordering service node, identifying at least two blocks from among the received blocks that belong to a same slot within the blockchain, validating the at least two identified blocks in parallel via execution of the at least two identified blocks at a same time, and in response to validation of the at least two identified blocks, storing the at least two identified blocks on a local blockchain ledger of a blockchain peer.

A further example embodiment provides a non-transitory computer-readable medium comprising instructions, that when read by a processor, cause the processor to perform one or more of receiving blocks of a blockchain from one or more of a neighboring blockchain peer and an ordering service node, identifying at least two blocks from among the received blocks that belong to a same slot within the blockchain, validating the at least two identified blocks in parallel via execution of the at least two identified blocks at a same time, and in response to validation of the at least two identified blocks, storing the at least two identified blocks on a local blockchain ledger of a blockchain peer.

BRIEF DESCRIPTION OF THE DRAWINGS

FIG. 1B is a diagram that illustrates a partially-ordered blockchain ledger according to example embodiments.

FIG. 4A is a diagram that illustrates a process of validating blocks in parallel during a peer operation according to example embodiments.

DETAILED DESCRIPTION

Figure 1A:
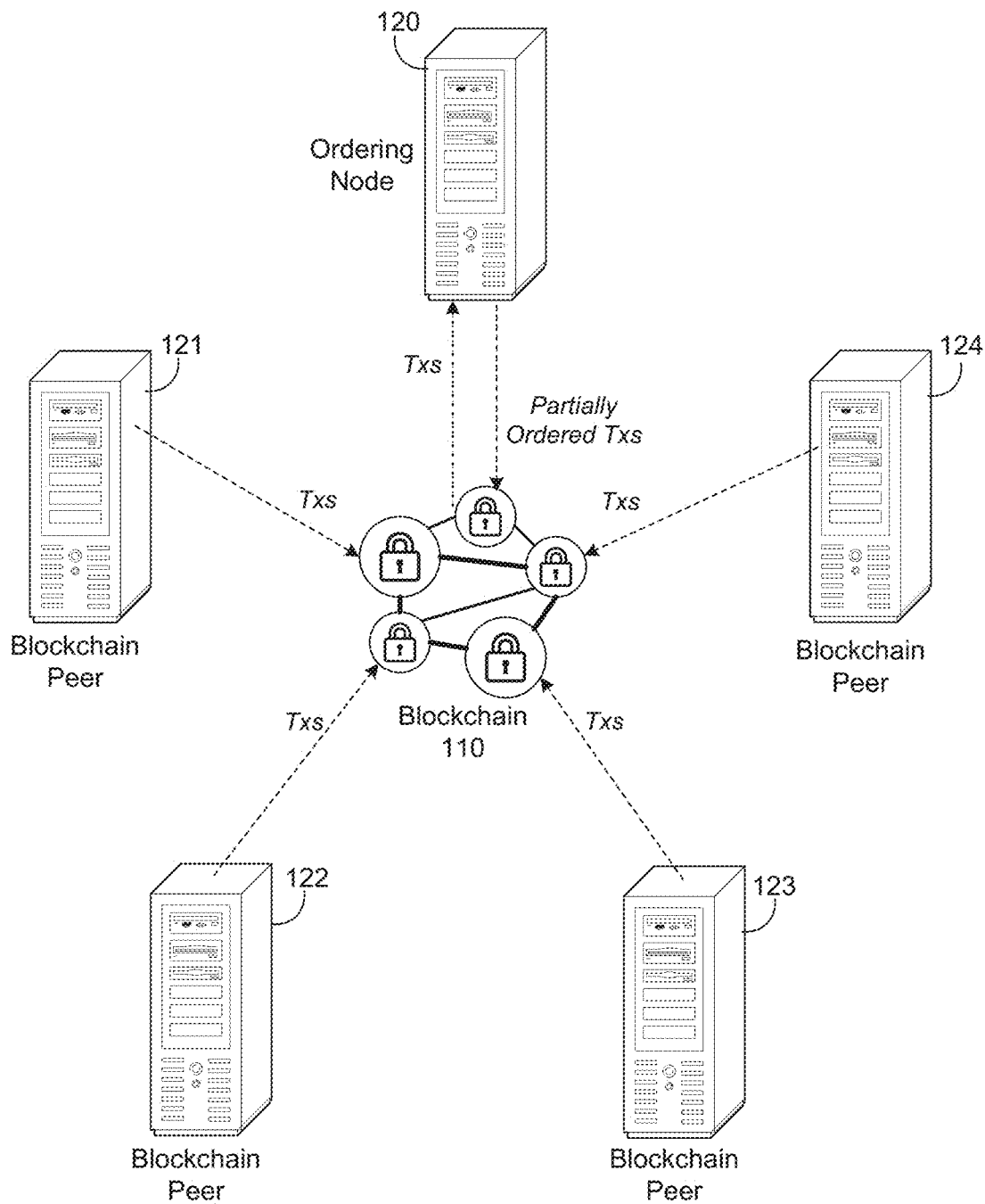
FIG. 1A is a diagram that illustrates a blockchain network according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined or removed in any suitable manner in one or more embodiments. Further, in the diagrams, any connection between elements can permit one-way and/or two-way communication even if the depicted connection is a one-way or two-way arrow. Also, any device depicted in the drawings can be a different device. For example, if a mobile device is shown sending information, a wired device could also be used to send the information.

In addition, while the term "message" may have been used in the description of embodiments, the application may be applied to many types of networks and data. Furthermore, while certain types of connections, messages, and signaling may be depicted in exemplary embodiments, the application is not limited to a certain type of connection, message, and signaling.

Example embodiments provide methods, systems, components, non-transitory computer readable media, devices, and/or networks, for a partially ordered blockchain ledger in which blocks are arranged in slots instead of a linear sequence.

In one embodiment the application utilizes a decentralized database (such as a blockchain) that is a distributed storage system, which includes multiple nodes that communicate with each other. The decentralized database includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In various embodiments, a permissioned and/or a permissionless blockchain can be used. In a public or permission-less blockchain, anyone can participate without a specific identity. Public blockchains can involve native cryptocurrency and use consensus based on various protocols such as Proof of Work (PoW). On the other hand, a permissioned blockchain database provides secure interactions among a group of entities which share a common goal but which do not fully trust one another, such as businesses that exchange funds, goods, information, and the like.

This application can utilize a blockchain that operates arbitrary, programmable logic, tailored to a decentralized storage scheme and referred to as "smart contracts" or "chaincodes." In some cases, specialized chaincodes may exist for management functions and parameters which are referred to as system chaincode. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

This application can utilize nodes that are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

This application can utilize a ledger that is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). Each participating party (such as a peer node) can maintain a copy of the ledger. A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

This application can utilize a chain that is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Since the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Blockchain frameworks such as Hyperledger Fabric provide an enterprise-grade permissioned distributed ledger technology (DLT). The permissioned blockchain is different from a public blockchain because in the permissioned blockchain access is restricted to only members of the blockchain. Hyperledger Fabric is credited with introducing a new architecture for storing blockchain transactions on the ledger, referred to as execute-order-validate. It is know a universal blockchain architecture used in both industry and public domain.

One of the key elements of an execute-order-validate blockchain network is an ordering service (also referred to herein as an ordering node). The role of the orderer is to provide blocks that have been executed in an ordered manner to blockchain peers for storage on their respective ledgers. Orderers provide a shared communication channel to clients and peers, offering a broadcast service for message containing transactions. Orderers also ensure that transactions are strictly ordered (i.e., every transaction is strictly before or after another transaction.

When an orderer has received enough transactions, and has ordered the transactions, the orderer will generate a block and broadcast the block to the blockchain peers participating the blockchain network. Each block includes a hash of an immediately previous block on the blockchain. This creates a link between the two blocks. This process is repeatedly continuously as new blocks are made. The result is a linear sequential order of blocks. However, blocks are limited in size. Furthermore, validation of such blocks requires a validation of each hash in the linear sequence of blocks. This can result in hundreds, thousands, or even millions of hashes being verified during a validation process.

The example embodiments introduce a new ordering process for blocks on a blockchain ledger, referred to as partially-ordered transactions or partially-ordered blocks. Blocks may store hundreds or thousands of transactions. However, not all blocks have dependencies on each other. For example, a new block may not be transaction-dependent on an immediately previous block. The system described herein takes advantage of this non-dependency, and introduces the use of slots on the blockchain ledger. Slots may be used by the ordering service to hold multiple blocks in parallel with one another, and in sequence with other slots. For example, a slot may hold two or more blocks, and each of the two or more blocks may include a hash link to a previous slot. In this example, rather than include a hash link to one block (such as an immediately previous block) each of the two or more blocks in the current slot may include a hash function based on a combination of blocks in a previous slot.

Some of the benefits of a partially-ordered blockchain (and transactions therein) include the ability to validate/execute blocks in parallel. In a traditional blockchain, validation occurs in a linear sequence where each block hash is verified in a sequential order. The result is a continuous string of hash verifications that are performed in a linear manner. In contrast, the partially-ordered blockchain enables multiple blocks (e.g., blocks in the same slot, etc.) to be executed/validated in parallel. This can significantly reduce the amount of time necessary for validating the blockchain. Other benefits are also created by the partially-ordered blockchain include faster peer recovery/bootup, faster query processing, selective validation of blocks for improved transaction throughput, adoption of different DAG based methods by a group of peers of any organization for improved transaction throughput and query response times, ordering of encrypted blocks of transactions, and the like.

FIG. 1A illustrates a blockchain network 100 which adheres to an execute-order-validate framework, according to example embodiments. Referring to FIG. 1A, the blockchain network 100 includes a plurality of blockchain peer 121, 122, 123, and 124, which store a distributed copy of a blockchain ledger (blockchain 110). Clients (not shown) may propose transactions via the blockchain peers 121-124 for storage on the blockchain 110. Before transactions may be committed to the blockchain 110, the transactions may be executed by one or more endorsing peers. Any of the blockchain peers 121-124 may act as endorser.

Successfully executed transactions may then be provided to the ordering node 120 (e.g., by the client, etc.). The ordering node 120 receives transactions, orders them based on timestamps, and stores the ordered transactions in blocks. When enough transactions have been received, or a predetermined time limit has expired, a new block holding ordered transactions may be cut and sent to the blockchain peers 121-124 for storage. Prior to storage, each of the blockchain peers 121-124 may validate the transactions once again, prior to storing the blocks on their respective copy of the blockchain 110. However, rather than the ordering node 120 ordering blocks into linear sequences, the ordering node 120 may create partially-ordered blocks/transactions, as shown in FIG. 1B.

In particular, FIG. 1B illustrates an example of a partially-ordered blockchain ledger 110 according to example embodiments. As will be appreciated, not all transactions have dependencies between themselves, nor are transactions in a current block always dependent on each previous block on the blockchain. Partial ordering exploits this notion and provides a mechanism by which non-dependent blocks (blocks which do not have any inter-dependent transactions) can be stored on a same slot on the blockchain ledger. In order to prevent a slot from becoming too large, the ordering node 120 may implement a slot-size maximum, a cut-off time, and/or the like.

According to various embodiments, the ordering node 120 can arrange the transactions in such a way that they can avoid dependency between blocks for as long as possible (or until a slot size maximum or cut-off time is reached. In addition, the example embodiments introduce the concept of slots on the blockchain ledger. A slot is essentially a group of blocks which can be arranged in parallel on the blockchain ledger (which is traditionally linear-sequential). The parallelly-arranged slot can run vertically (parallelly) while the different slots of the ledger run horizontally (sequentially one after the other), in contrast to a traditional linear sequence of blocks. For the purposes of time, the blocks in the same slot are assumed to be equal. The system can introduce this concept since none of the blocks include inter-dependent transactions thus removing the criticality for timing differences among different blocks in the same slot.

FIG. 1B illustrates an example of four slots 111, 112, 113, and 114 of respective blocks 115. It is not necessary that a slot include more than one block. In other words, a slot may include only a single block or it may include two or more blocks. Also, the number of blocks within each slot 111-114 may be limited by a slot size, a cut-off time monitored by the ordering node 120, and the like.

For transactions in the same slot, the transactions may have various properties that are identified and implemented by the ordering node 120. For example, a transaction in a block (e.g., block 9) of slot 112 can depend on the transactions in that same block (e.g., block 9), or on the transactions present in blocks (e.g., block 8) of a previous slot 111 (or slots). However, a transaction in a block cannot depend on transactions of other blocks in the same slot. Therefore, block 9 cannot have transactions that are dependent on blocks 10, 11, or 12, and vice versa. When a new block has a transaction that is dependent on any transaction present in a block of the current slot, the ordering node 120 creates a new slot. For example, if while creating slot 112, the ordering node 112 receives a transaction that is dependent on block 10, then the ordering node may create block 13 and at the same time also create slot 113.

Meanwhile, the previous hash value stored in each block is different than in a traditional linear sequential blockchain. In the example of FIG. 1B, a function 116 is used to create the previous hash value. For example, each of the blocks in the same slot may store the same previous hash value. Furthermore, the previous hash value may be a value that is generated based on a combination of hash values/blocks from an immediately previous slot. For example, blocks 13, 14, and 15, belong to the same slot 113 (also referred to as slot i). Here, each of the blocks 13, 14, and 15 may store a previous hash value that is based on a combination of hashes from blocks 9, 10, 11, and 12 that belong to an immediately previous slot 112, and based on a previous hash value 116 of the blocks 9, 10, 11, and 12. This ensures that the sequential nature of the slots is maintained, while also allowing for parallelism among blocks in the same slot.

According to various embodiments, the previous hash value of a new block in slot (i) is a function (Fn) of the hashes of the blocks present in a previous slot (i–1). Examples of the function Fn include an XOR of hashes of blocks in a previous slot. As another example, the function Fn may be a compounding hash of blocks in the previous slot. For example, a compounding hash may be a secondary hash of the key as a function of the hashes of blocks in the previous slot.

In the example of FIG. 1B, blocks 9-12 are non-dependent on each other and hence, belong to the same slot 112. Meanwhile, block 13 violates the non-dependency requirements because at least one of the transactions in block 13 depends on transactions present in one of blocks from 9 to 12. Therefore, the ordering node 120 creates a new slot 113 and block 13 is added to the slot 113. Furthermore, previous hash value for the block 13 is a function 116 that is based on blocks present in the previous slot 112. Meanwhile, remaining blocks 14 and 15 do not depend on transactions in block 13, or inter-depend on each other. Therefore, blocks 14 and 15 are added to the slot 113. Meanwhile, either block 16 violates the dependency requirements or block 16 is received after a slot limitation parameter.

For example, to prevent the computational cost from exploding, the ordering node 120 may implement one or more of a slot size requirement and a cut-off time requirement. The slot size requirement limits the number of blocks (or transactions) that can be present in one slot. If the number of blocks in the slot reaches the allotted slot-size parameter, then the ordering node 120 cuts a new slot and places a next block in the new slot. As another example, the cut-off time parameter is a maximum allotted time in which the ordering node 120 can add blocks to the current slot. The cut-off time parameter may be tracked by the ordering node 120 which starts a timer when a new slot is created. Here, the ordering node 120 will keep adding blocks to the slot until the timer expires/completes. When the ordering node 120 starts a new slot, the ordering node 120 restarts the time. In the example of FIG. 1B, it is assumed that a timer expired during the creation of slot 113, and block 16 was created after the expiration of the timer. Therefore, block 16 is added to a new slot 114.

The ordering node 120 may maintain slot read set and slot write set, containing keys which have been read by or written to by the transactions in the blocks belonging to the current slot. By limiting the size of the slot, resources used by the ordering node 120 for maintaining these sets is bounded. In some embodiments, a new slot may also be created when the ordering node 120 receives a new transaction dependent on a transaction in some previous block of the current slot. In this case the resources used by the orderer will automatically be reset. The limit on size of a slot ensures that orderer does not get overwhelmed in case no new transaction dependent on a transaction in some previous block of the current slot comes. The actual size of the slot can be set depending on the resources available at the orderer. Additionally, if the size of a slot is not limited, then the previous block hash validation may take a long time since it needs to wait for many immediate previous blocks to be received. All blocks in a slot may not be validated in parallel due to limited number of processors each peer possesses.

As another example, by limiting the amount of time in which a slot is open, resources used by the ordering node 120 for maintaining these sets are bounded. The limit on amount of time a slot is open likewise ensures that the ordering node 120 does not get overwhelmed in case no new transaction dependent on a transaction in some previous block of the current slot comes. The actual amount of time for which a slot is open can be set depending on the resources available at the orderer. If the amount of time for which a slot is open is not limited, then the transactions that are included in the slot at the beginning/earlier suffer from high latency.

In these examples, a new slot may be created in three following scenarios. For example, a new slot may be created when the ordering node 120 receives a new transaction dependent on a transaction in some previous block of the current slot. As another example, the ordering node 120 may create a new slot when a slot size is reached. As another example, the ordering node 120 may create a new slot when a cut-off time is reached.

Meanwhile, the blockchain peers 121-124 may receive the blocks from the ordering node 120 after the blocks have been created. Here, the blockchain peers 121-124 may receive the blocks one at a time. Therefore, it is not apparent immediately of the slots/partial-order of the blocks in the blockchain ledger 110. When a blockchain peer (e.g., 121-124) receives a new broadcasted block from the ordering node 120, the blockchain peer may check whether the block belongs in a current slot by checking if a previous hash value in the new block is a function of hashes of blocks present in a previous slot.

If the previous hash is not a function of hashes of the previous slot, the blockchain peer may check if the new block belongs to the next slot. In this case, if the new block belongs to the next slot, then the previous hash value in the new block should be a function of hashes of the blocks in the current slot. If the hash value can be successfully checked, the blockchain peer increments the current slot pointer and creates a new slot on the blockchain ledger. If the hash value does not match, the blockchain peer has yet to receive some blocks in the current slot on which the transactions in this block can potentially depend upon. Furthermore, due to the redundancy in a blockchain network, each block is expected to be received by all the peers. The blockchain peer may store the block in a buffer and periodically check if it belongs to the current slot or not.

To keep track of transactional dependencies, the ordering node 120 may use a hash set to keep track of keys of the transactions for each block in a slot. In this example, a transaction could be added to a block if it only depends on transactions present in that block or blocks in the previous slot(s). Meanwhile, if a transaction cannot be added to a current slot, the ordering node 120 can either decide to create a new slot and put the transaction there, or hold back the transaction and process other transactions that can be added to the current slot. In this case, the ordering node 120 can take measures to ensure that no starvation occurs for the withheld transactions (e.g., limit on the waiting time before a transaction is included in a block).

For each key, the ordering node 120 may maintain separate metadata about which transactions (present in which block) are read and modified. Although this method is expensive in terms of memory requirements, the metadata can be advantageous for permissioned platforms where the peers trust the ordering node 120. When a peer joins the blockchain network 100, it will start receiving blocks. In the existing scenario, a peer must request all the previous blocks before it could validate transactions from the currently received block. However, in the example embodiments, due to partial ordering, a blockchain peer can request for only those blocks on which the transactions in the current block depend.

The hash set generated by the ordering node 120 may include a set of all the keys which have been read by or written to by the transactions in the blocks belonging to the current slot. The ordering node 120 can maintain this set in various data structures such as via hash-set or via linked list or via arrays etc. In some embodiments, the ordering node 120 may maintain two sets including a slot read set and a slot write set. The slot read set may include keys which have been read by the transactions belonging to the blocks in the current slot. The slot write set may include keys which have been written to by the transactions belonging to the blocks in the current slot. When a new transaction comes, the ordering node 120 may compare its read/write set with the slot read set and slot write set. Using this comparison, the ordering node 120 can decide if the transaction can be put in the block belonging to current slot or does it require a new slot.

As another example, the ordering node 120 may create a directed acyclic graph (DAG) of transactions submitted by clients. In this example, transactions belonging to the same connected component can be placed in the same block, or in different blocks across different slots. In addition, transactions belonging to different components can be put in the same slot (but different blocks in the same slot).

The example embodiments provide significant benefits over a traditional linearly ordered blockchain. For example, the example embodiments describe an ordering node which implements partial ordering among transactions of the blockchain. The ordering node may identify the dependencies among the keys of different transactions arriving in a time period and create different blocks and order them together (i.e., a slot in the blockchain ledger) which can be executed simultaneously by any peer. The previous hash of a block includes a function of hashes of blocks in the previous slot (e.g., an exclusive OR of the hashes, compounding hash, etc.) In some embodiments, a number of blocks in a slot is limited by the maximum number of blocks allowed in a slot, or a timeout after which no more blocks can be added to the current slots. In some embodiments, the ordering node ensures that no transaction is starved while ensuring to maximize the number of blocks that fit in a slot.

Figure 2A:
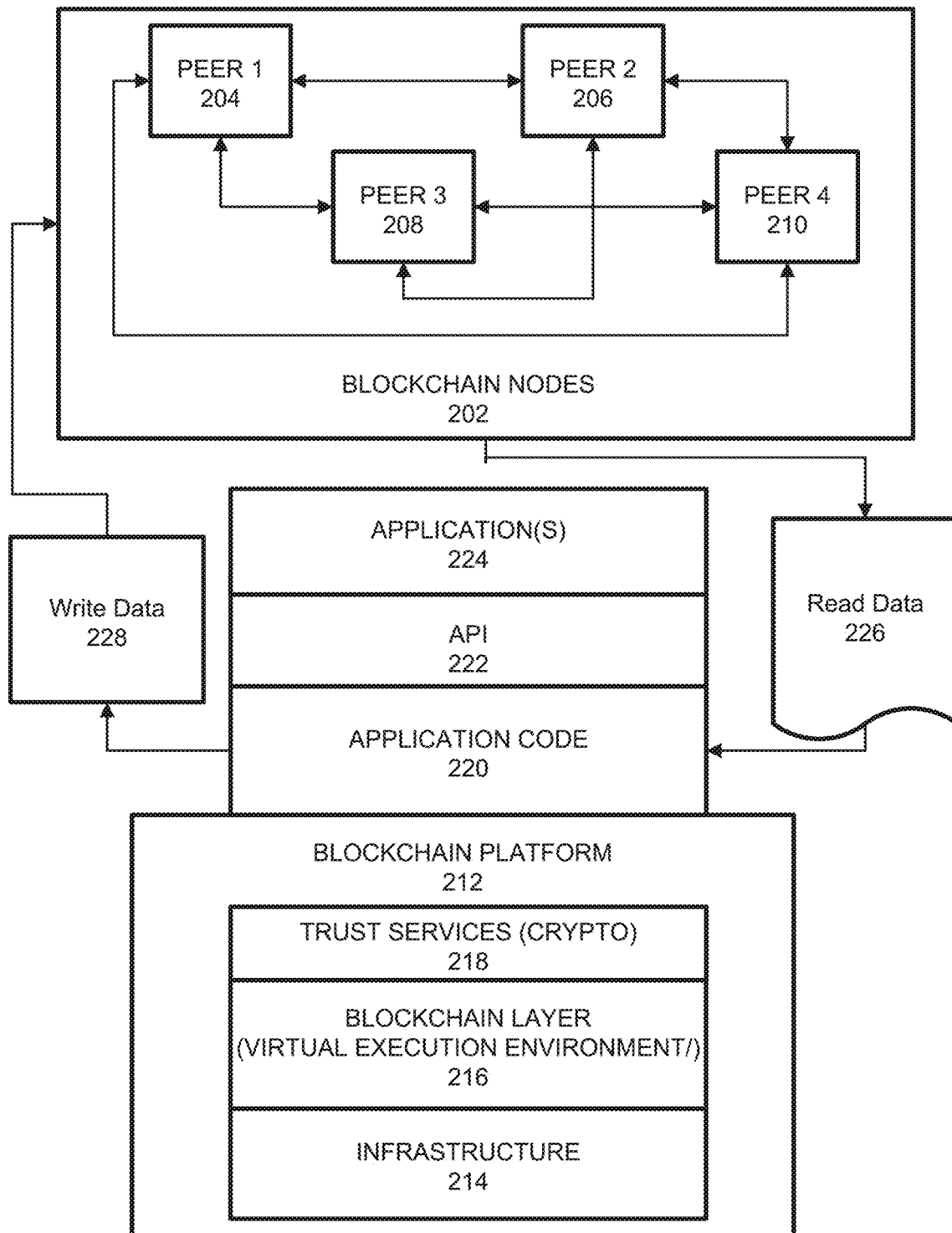
FIG. 2A is a diagram that illustrates a blockchain architecture configuration, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, read data 226 may be processed by one or more processing entities (e.g., virtual machines) included in the blockchain layer 216 to create processing results to be written to the blockchain which include write data 228. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 2B:
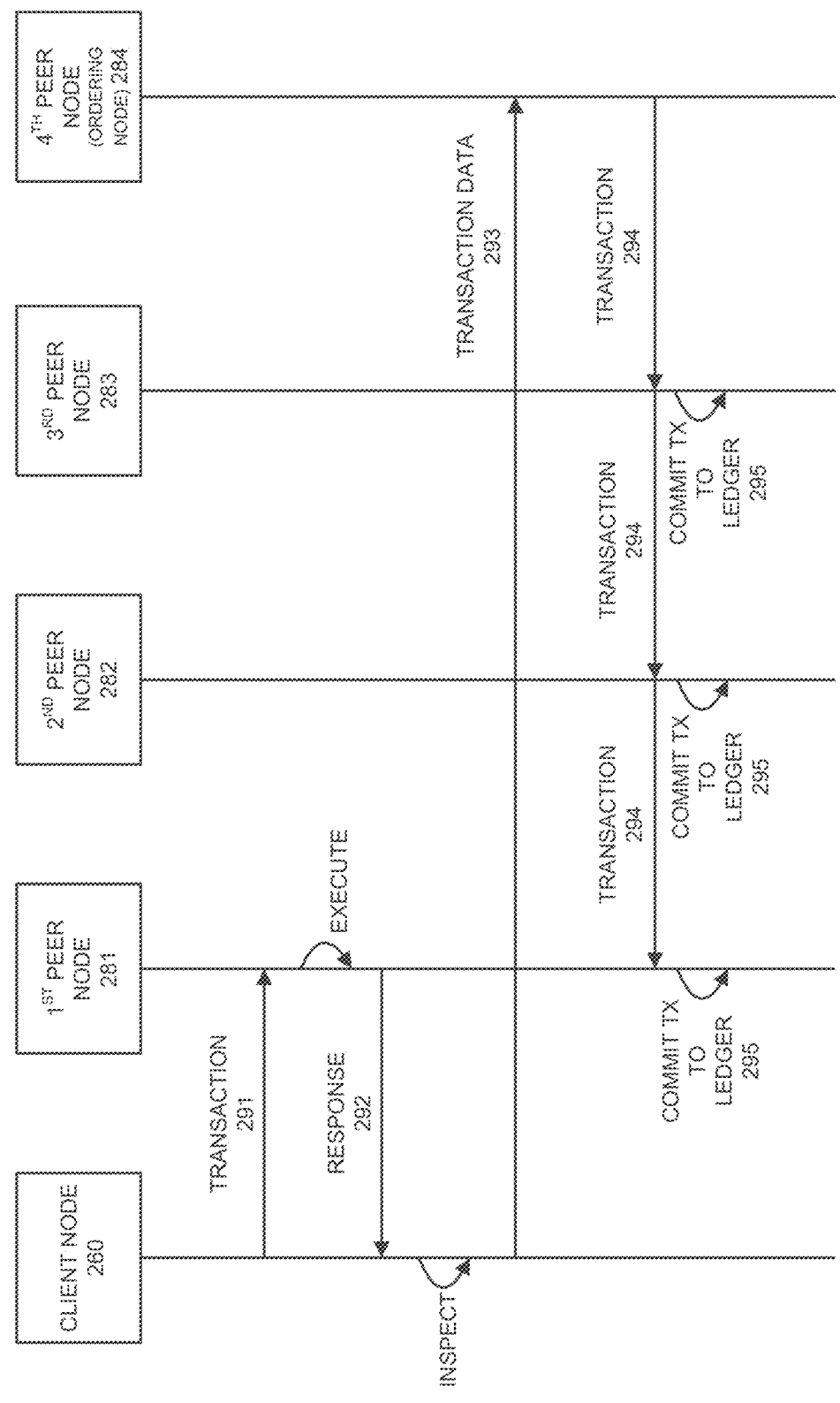
FIG. 2B is a diagram that illustrates a blockchain transactional flow, according to example embodiments.

FIG. 2B illustrates an example of a blockchain transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

Referring again to FIG. 2B, the client node 260 initiates the transaction 291 by constructing and sending a request to the peer node 281, which is an endorser. The client 260 may include an application leveraging a supported software development kit (SDK), which utilizes an available API to generate a transaction proposal. The proposal is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3A:
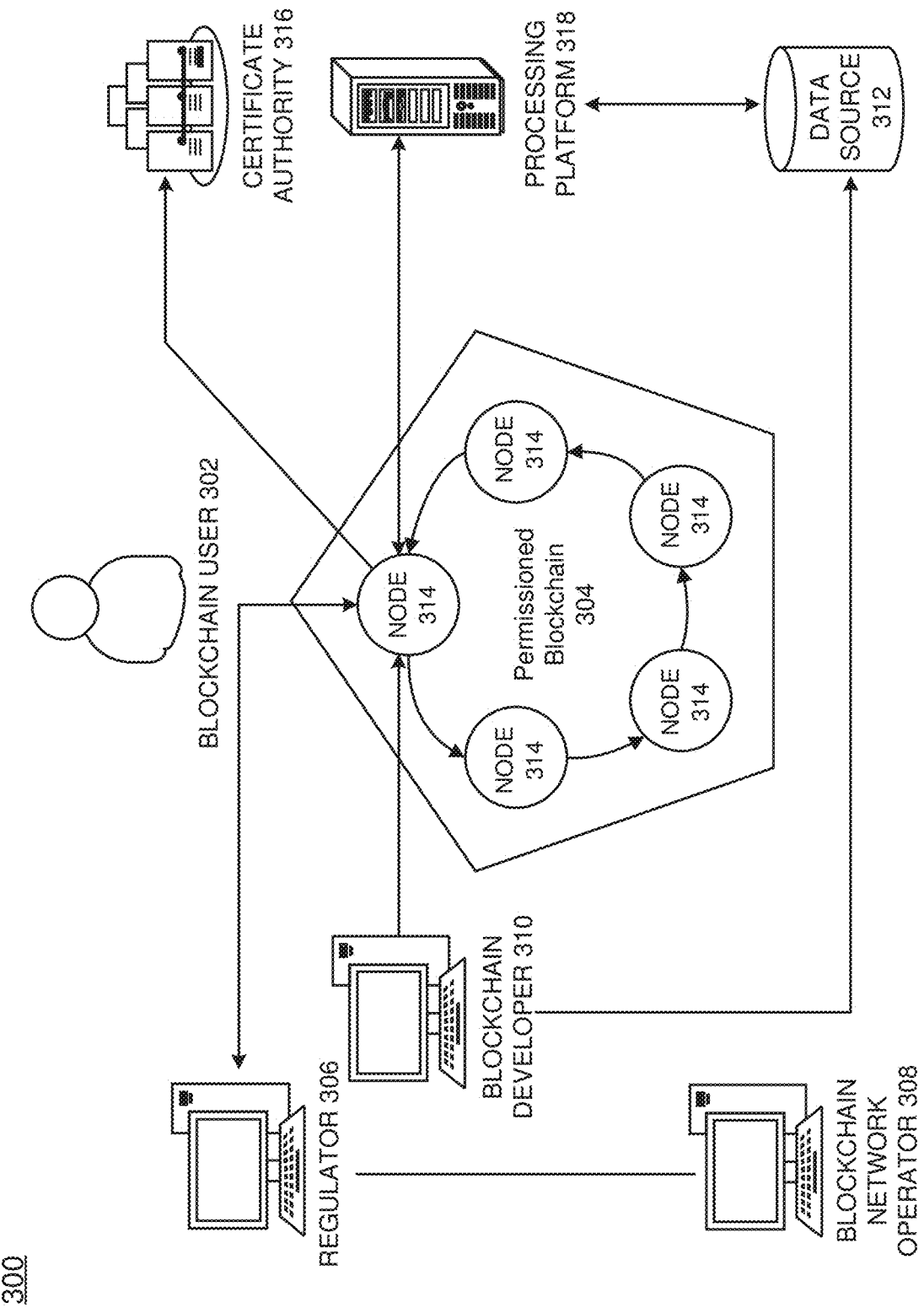
FIG. 3A is a diagram that illustrates a permissioned blockchain network, according to example embodiments.

FIG. 3A illustrates an example of a permissioned blockchain network 300, which features a distributed, decentralized peer-to-peer architecture. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
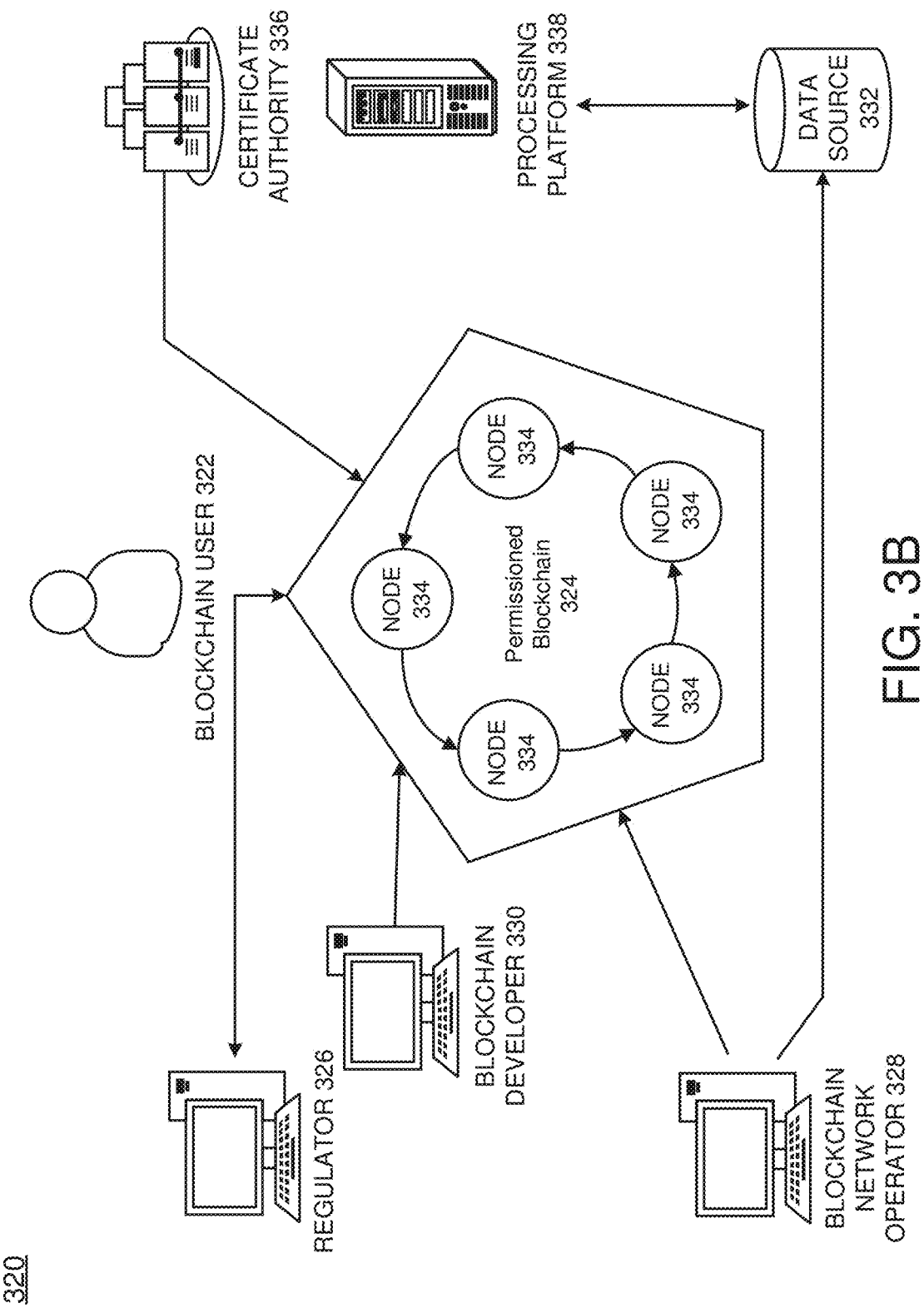
FIG. 3B is a diagram that illustrates another permissioned blockchain network, according to example embodiments.

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger. Additionally, all parties have the choice of running a node on the system and employing the mining protocols to help verify transactions.

Figure 3C:
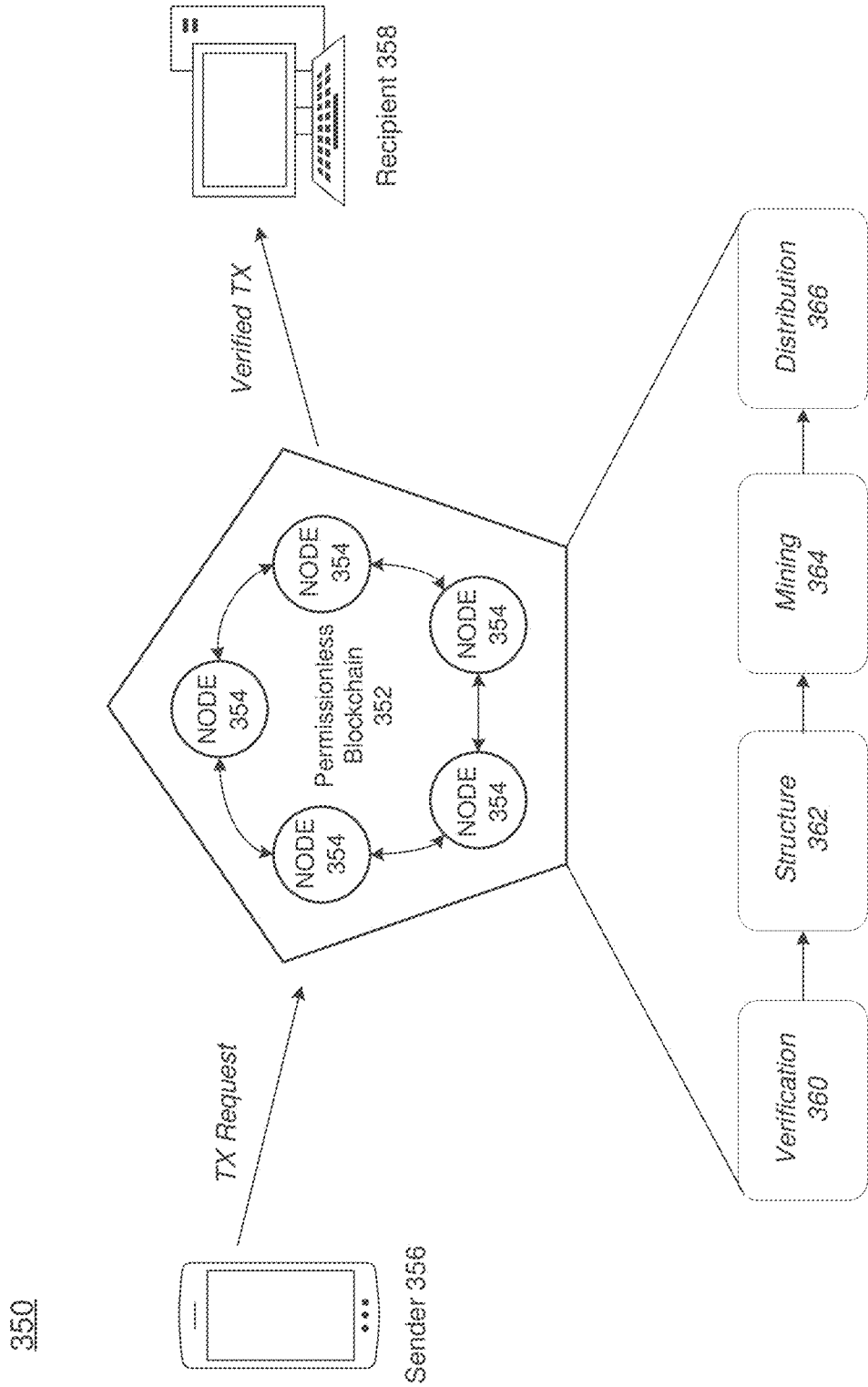
FIG. 3C is a diagram that illustrates a permissionless blockchain network, according to example embodiments.

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution 366, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

FIG. 4A illustrates a process 400A of validating blocks in parallel during a peer operation according to example embodiments. Referring to FIG. 4A, a blockchain peer 420 may simultaneously retrieve a plurality of blocks 411-414 during a boot-up or recovery process when restoring its local blockchain ledger 422 including a blockchain 424 and a state database 426.

By default, in the existing blockchain protocols, a blockchain peer needs to start many applications during reboot, at the same time it executes the different blocks of the blockchain in sequence. This leads to longer boot time since the blocks are executed sequentially. However, in the example embodiments, the blockchain peer 420 may execute the blocks 411-414 in parallel, which saves the required amount of time needed to complete the block validation for the entire blockchain 410. Parallel validation of multiple blocks is available due to the partial ordering of transactions in slots. This results in faster recovery of crashed peers and/or new peers booting up for the first time.

For example, the blockchain peer 420 may use multiple physical cores to speed up the recovery process. When the blockchain peer 420 starts the recovery process, it will receive blocks from another peer (not shown) via gossip protocol. In response, the blockchain peer 420 may identify the blocks 411-414 belonging to the same slot. These blocks 411-414 belonging to the same slot can be restored concurrently using multiple threads (possibly running on multiple physical cores in the blockchain peer 420). This inter-block parallelism improves the recovery time compared to current systems which must execute blocks in a linear sequence.

Figure 4B:
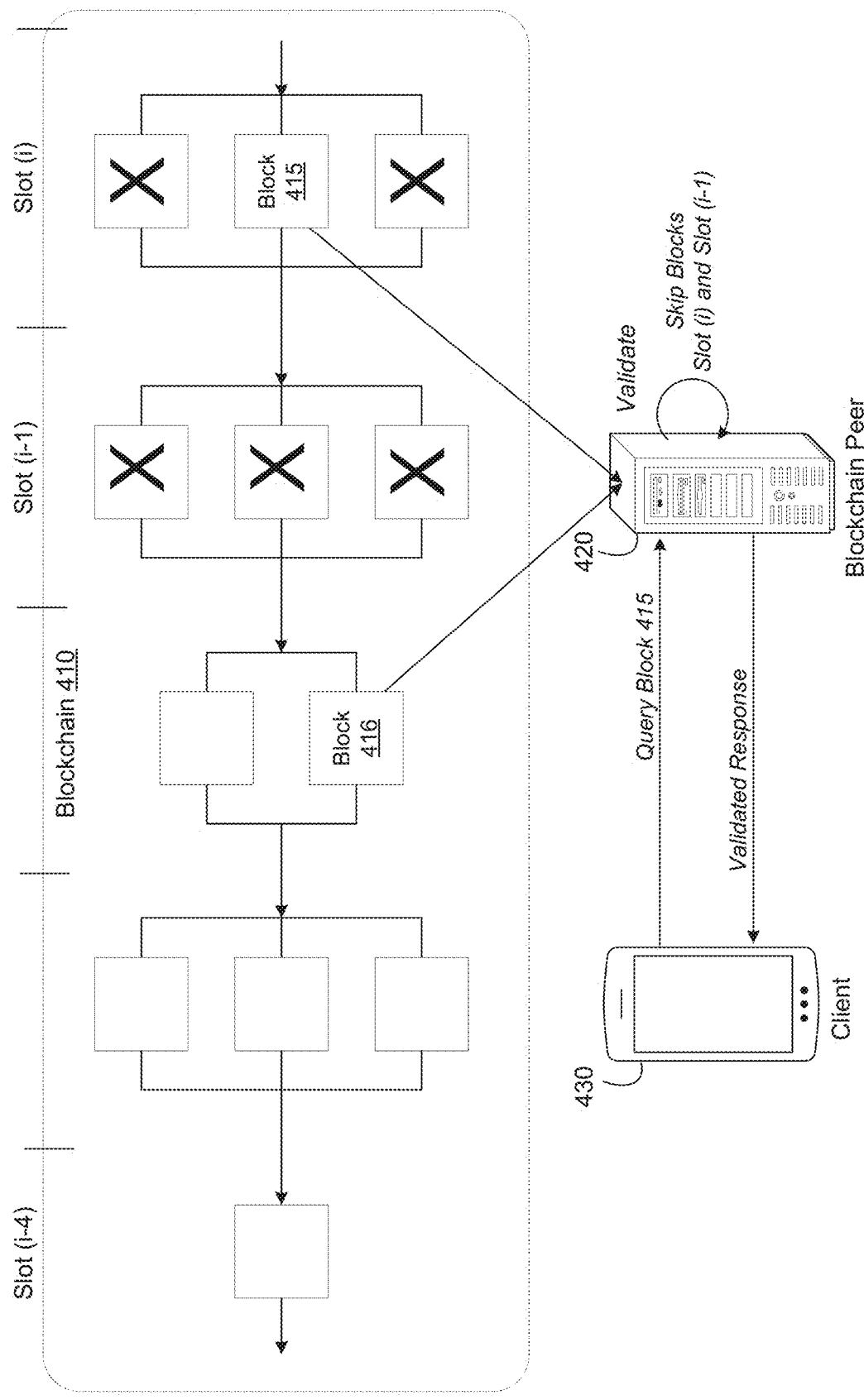
FIG. 4B is a diagram that illustrates a process of skipping the validation of blocks during a query retrieval operation according to example embodiments.

For example, during process 400A, the blockchain peer 420 may collect blocks from a neighboring peers. The collection process may be performed during a boot or restart. The blockchain peer 420 may also initialize its local ledger 422. The blockchain peer 420 may retrieve the blocks 411-414 at the same time, and simultaneously validate the blocks 411-414 using different cores/processors independently at the same time (without any additional processing). The blockchain peer 420 may update the state database 426 in parallel via the different cores of the blockchain peer 420. This results in reduction in time of peer recovery/boot. With transactions partially ordered in the blockchain 410, it is possible to validate multiple blocks belonging to a same slot in parallel without additional processing FIG. 4B illustrates a process 400B of skipping the validation of blocks during a query retrieval operation according to example embodiments. Referring to FIG. 4B, the blockchain peer 420 receives a query for a transaction stored in block 415. The query may be received from a client 430, etc. In response, the blockchain peer 420 may validate the block 415, and previous blocks in the blockchain 410. However, rather than validate all blocks as done in a traditional blockchain ledger, the blockchain peer 420 may skip over blocks which are non-dependent on block 415 and remove them from the validation process.

By default, in existing blockchain protocols, a peer node must validate all the previous blocks of a current block before replying to the queries on the keys of the current block. This leads to longer query response time since the blocks are validated sequentially. However, the keys in the current block might not be dependent on the previous block. Despite this, it is mandatory to validate the previous blocks on the chain before responding to the query. In contrast, in the process 400B, the blockchain peer 420 need not execute all the predecessor blocks before responding to a query, which saves the amount of time required to respond to a query. For example, the blockchain peer 420 may skip blocks in a slot (i) which includes the block 415 of the query. In addition, the blockchain peer 420 may skip other blocks (e.g., slot (i−1) if those blocks do not include dependent transactions of block 415. This skipping may be continued until a block is dependent on block 415.

For example, the blockchain peer 420 may receive a query for a transaction that is stored in block 415 of slot (i). Other blocks in the same slot (i) as the current block might be pending for validation (or not even received by the blockchain peer 420). However, the blockchain peer 420 may skip these blocks and only validate the current block (not bothering about the validation of the other blocks in the same slot) before responding to the query. Therefore, the blockchain peer may identify a next block in the chain prior to the block 415 and skip over the remaining blocks in between. This results in faster/improved query response time. Furthermore, the state database 426 is updated following the current block validation, and a query response is provided. After the remaining blocks in the same slot are validated, the state database 426 is updated accordingly. However, those updates do not impact the query response.

Figure 4C:
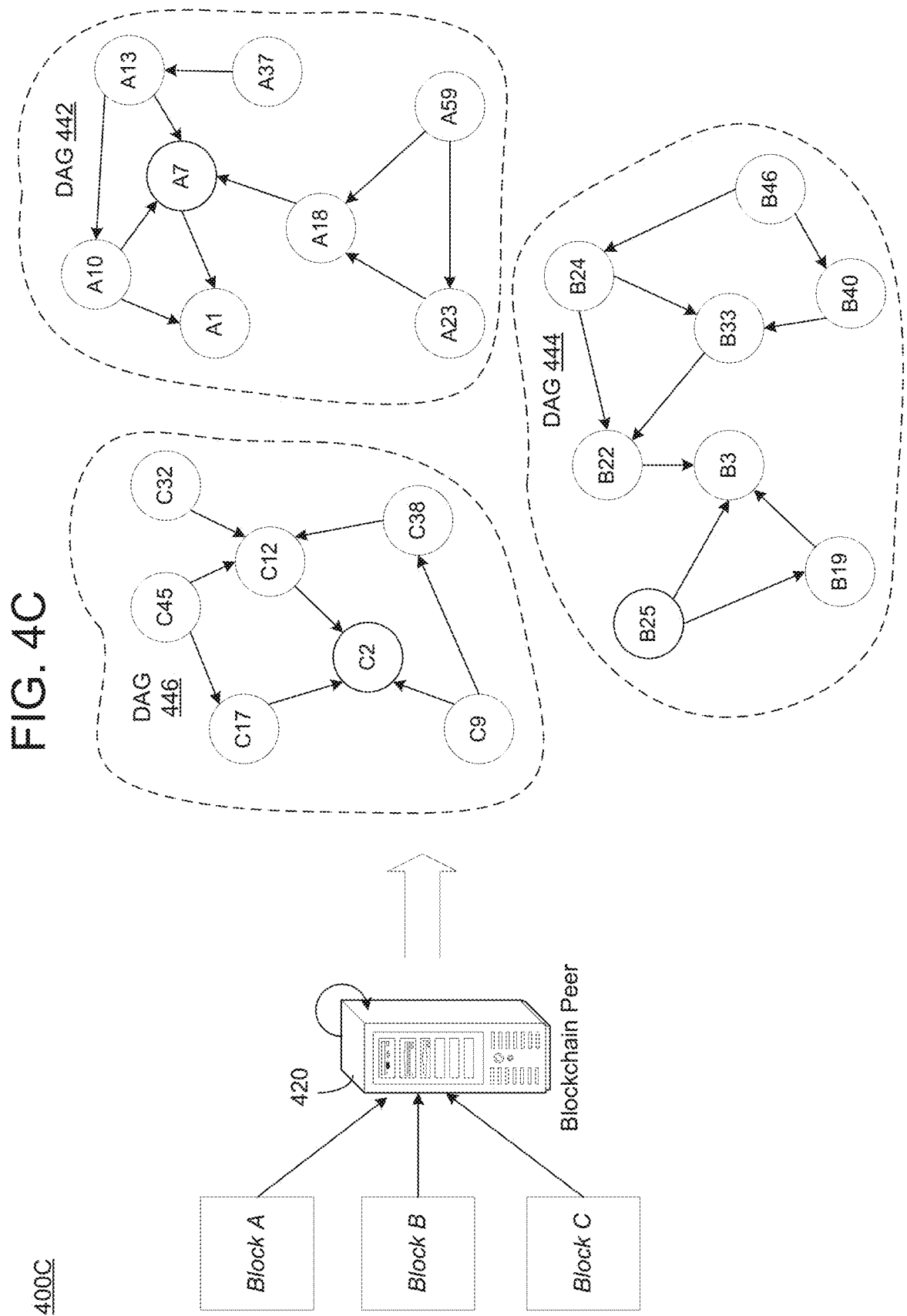
FIG. 4C is a diagram that illustrates a process of mapping transactions to DAGs for determining parallel processing options according to example embodiments.

FIG. 4C is a diagram that illustrates a process 400C of mapping transactions to DAGs for determining parallel processing options according to example embodiments. An organization can run multiple peers in a blockchain network.

By default, in existing blockchain protocols, all peers in an organization commit all valid transactions to the state database by executing the transactions in each block independently and sequentially. In some embodiments, only an anchor peer node may need to immediately validate the transactions in each block, so that the transaction turnaround time is not hampered. Other peers in each organization can buffer the blocks, and execute the transactions parallelly if possible. The example embodiments provide a mechanism by which transactions can be divided and executed in parallel using multiple blockchain peers of an organization based on the concept of partially ordered transactions.

In particular, referring to the process 400C in FIG. 4C, the blockchain peer 420 can construct DAG structures 442, 444, and 446, from the transactions present in blocks in adjacent Slots to further exploit the parallelism across slots as well. In the example of FIG. 4C, three blocks are disposed in the same slot (blocks A, B, and C). One of the features of partial-ordered transactions is that two blocks in a same slot cannot include inter-dependent transactions. However, each block may include dependent transactions therein. For example, each of blocks A, B, and C, may include a series of intra-dependent transactions. The blockchain peer 420 can graph these intra-dependencies using the DAG. In the DAG structure, the nodes represent transactions, and the links represent dependencies among the transactions. Furthermore, the blockchain peer 420 (or some other service) may split up/divide the transactions to be processed in parallel based on the DAG structures 442, 444, and 446 so that no two dependent transactions are executed across the multiple peers of the same organization at the same time.

For example, the ordering node may deliver each block to the anchor peer among a plurality of peers of an organization. In FIG. 4C, blockchain peer 420 represents the anchor node. The blockchain peer 420 may send each block it receives to all the other blockchain peers (not shown) in the organization. Furthermore, the blockchain peer 420 may validate the transactions of a block in-order (thus there is no delay for the client on the transaction execution status). This validation may be based on the parallel validation of blocks belonging to the same slot as in the example of FIG. 4A.

Furthermore, other peers in the organization can buffer the blocks before validating them to find if parallel validation is feasible among the transactions. These peers can buffer the blocks in Slot-i to find if the transactions in these blocks can be executed in parallel with the transactions from the later slots to Slot-i. A peer can construct a DAG out of each block from Slot-i and a block from Slot-(i+1) to find if that block from Slot-(i+1) can be validated together with the blocks from Slot-i. If there are no dependencies, then a block from Slot-(i+1) could be executed in parallel to the blocks in Slot-(i). The objective here is to achieve improved transaction throughput. And different peers in the same organization might implement these different combinations of DAG based parallelism. Since different peers are implementing different levels of parallelism as described in this example, the same peer may not be able to compute the query response at the earliest for different queries. And the incoming queries can be responded by any peer of an organization, whichever is able to compute the query response faster. To do this, the blockchain peer 420 may construct a DAG out of each block A, B, and C, to determine if transactions of the three blocks can be executed in parallel, or if they are dependent on one another. In DAG 442, transactions that are dependent on one another from Block A are shown. Likewise, in DAG 444 and 446, transactions that are dependent on each other in blocks B and C are shown, respectively.

In this example, a DAG helps segregate the transaction into groups so that there are no dependencies between transactions from different groups and hence a group of transactions can be validated in parallel with other group of transactions. The purpose of validating transactions using a DAG based analysis is to validate the transactions in parallel, thus to achieve improved transaction throughput.

Figure 4D:
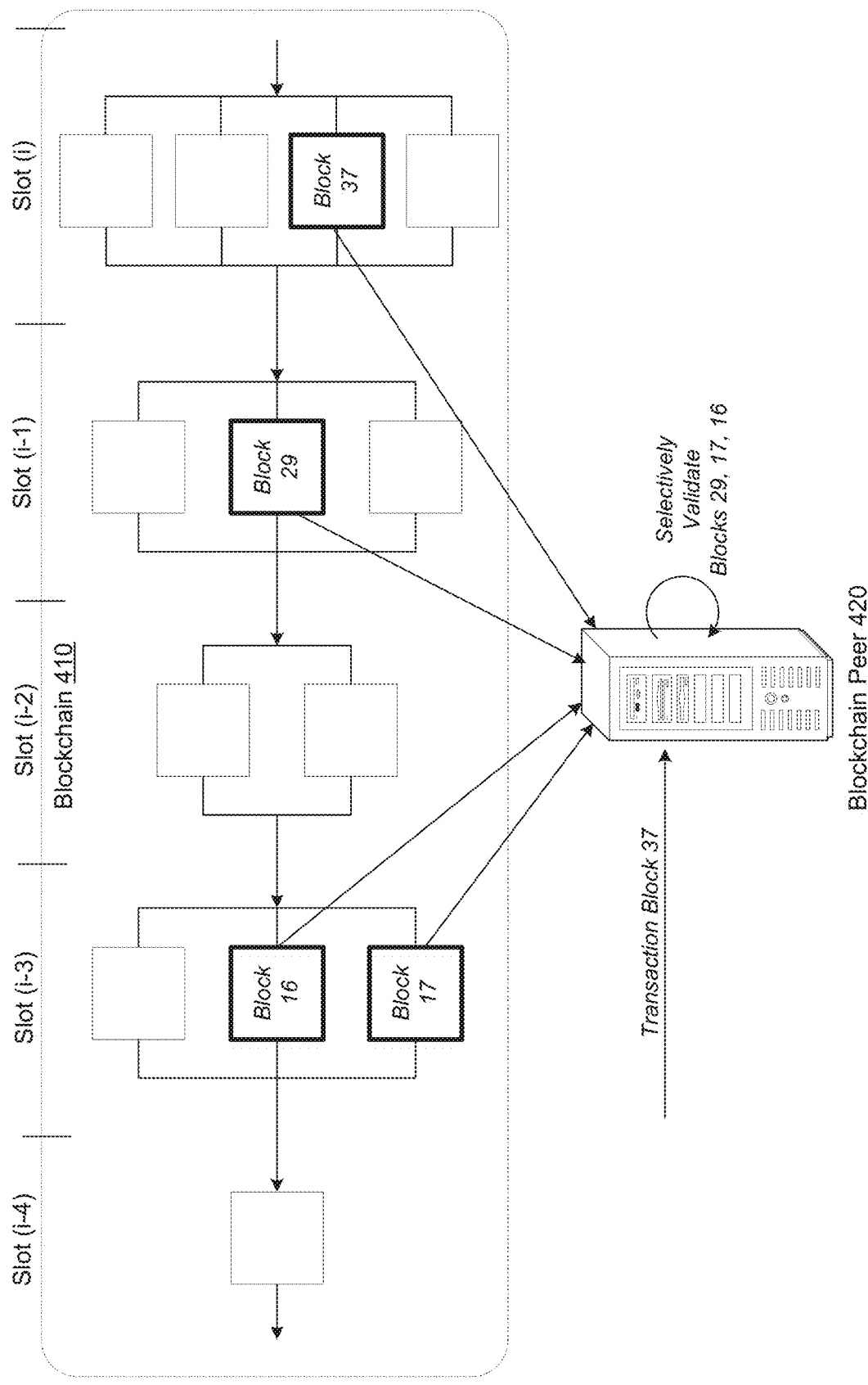
FIG. 4D is a diagram that illustrate a process of selectively validating blocks during storage of a new transaction according to example embodiments.

FIG. 4D illustrates a process 400D of selectively validating blocks during storage of a new transaction according to example embodiments. By default, in existing blockchain protocols, a blockchain peer needs to validate all the previous blocks of a current block before validating transactions of the current block. This leads to low transaction throughput. In particular, the keys in the previous block might not be of interest to a peer executing the current block (e.g., the previous block contains transactions related to a different smart contract in the same network, etc.). In the example embodiments, the blockchain peer 420 may not need to validate all the predecessor blocks before validating a transaction in the current block, and this leads to higher transaction throughput.

In the process 400D of FIG. 4D, the blockchain peer 420 may obtain the details of the previous transactions (along with their block numbers) on which the current transaction depends, from an ordering node which is possible due to the metadata available (e.g., hash set, etc.) with the ordering node. The blockchain peer 420 can selectively validate only the dependent predecessor transactions of the current transaction before validating the current transaction (and not wait for the validation of the other transactions in the previous blocks). This results in improved transaction throughput.

As described with respect to FIG. 1B, an ordering node may include a list of transactions (along with the block in which each of these transactions is present) updating any specific key-value pair (for e.g. periodically updating the R.O.I—rate of interest). This metadata is maintained at the ordering node. The metadata may include an identification of each key and it's dependencies. Here, the blockchain peer 420 knows the keys of the read/write sets of a transaction. Thus, the peer seeks the metadata (i.e., the selective transactions and the blocks which update a given key) for each of these keys from the ordering node. In the example of FIG. 4D, the blockchain peer 420 receives a transaction for block 37. Based on the hash set from the ordering node, the blockchain peer 420 identifies the dependencies of the keys of the transaction from block 37 are included in blocks 29, 17, and 16. Therefore, rather than validate all blocks, the blockchain peer 420 may selectively validate only the blocks 29, 17, and 16, that are dependent on the transaction in block 37.

In the example of FIG. 4D, the blockchain peer 420 may fetch the details of the predecessor transactions (along with the block numbers in which these transactions are part of) of a transaction in the current block from the metadata maintained by the ordering node. Different transactions in a block (or across blocks) may rely on different smart contracts. Therefore, not all transactions are related to one another.

In the example of FIG. 4D, the blockchain peer 420 may only process selective blocks which contain the dependent transactions of the current transaction in block 37. In this case, non-dependent transactions of the current transactions in those selected blocks are also not validated. This overcomes the requirement of completing the transaction validation of all the predecessor blocks of the current blocks which greatly improves the transaction throughput.

Figure 4E:
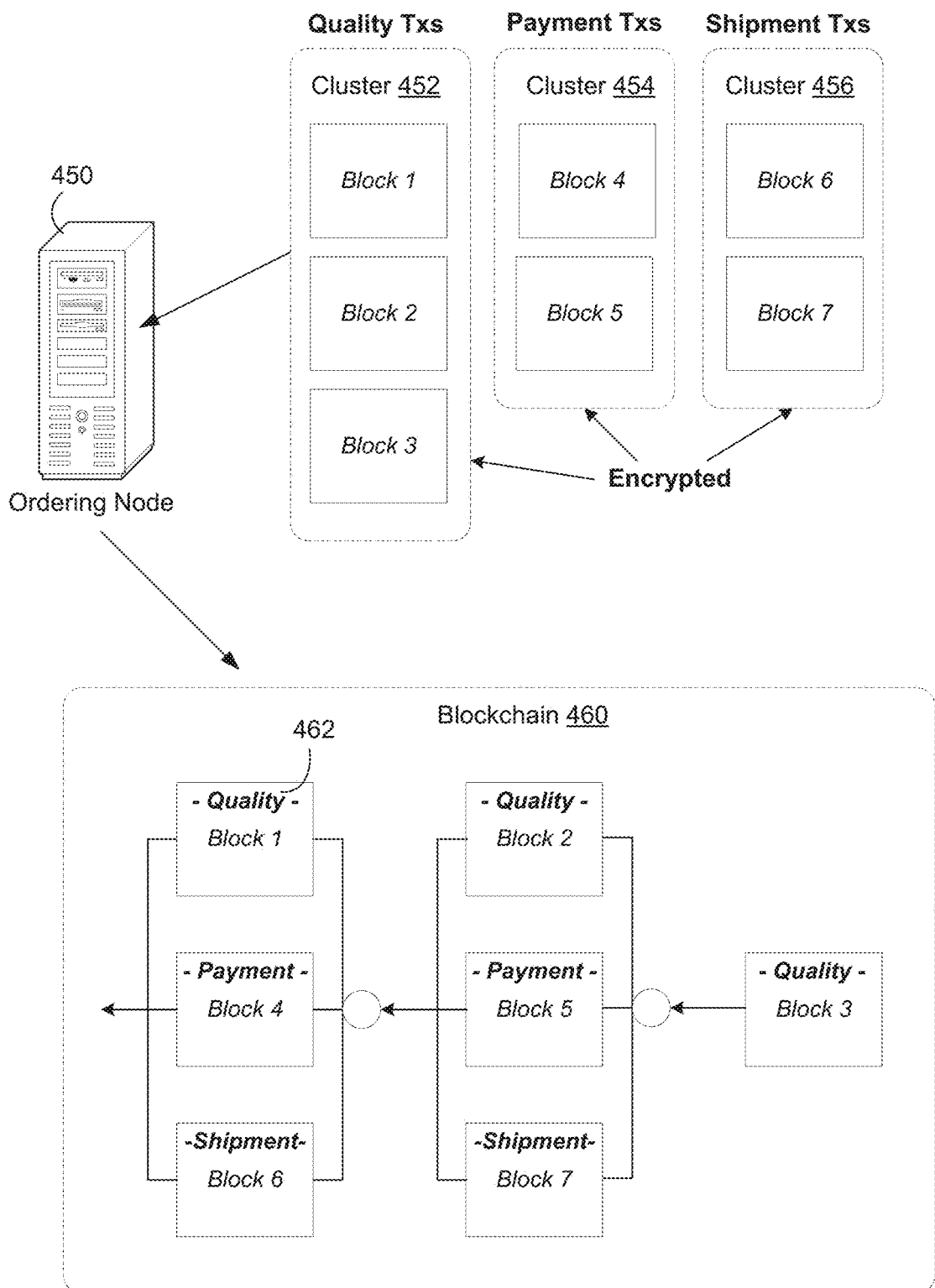
FIG. 4E is a diagram that illustrates a process of partially ordering encrypted blocks of data according to example embodiments.

FIG. 4E illustrates a process 400E of partially ordering encrypted blocks of data according to example embodiments. In this example, an ordering node 450 is able to implement partial ordering of blocks even in a situation where the transactions are encrypted (and thus dependencies are hidden). For example, due to privacy concerns, the transactions along with the read/write sets might be encrypted. In order to enable the ordering node 450 to arrange the transactions in slot-wise fashion, each encrypted transaction may have a key associated with it. Here, the keys may be assigned by a transaction submitter such as a client, a peer, or the like. Transactions that are associated with one another, may be submitted with a same key. In the example of FIG. 4E, the keys are "quality," "payment," and "shipment".

In this example, keys are assigned to transactions and may include different key names. Transactions with the same keys may be dependent on one another. However, transactions with different keys should not have dependencies among themselves. For example, the read/write sets for a transaction with the quality key should be different from the read/write sets for a transaction with the shipment key assigned thereto. According to various embodiments, the ordering node 450 may leverage these keys to arrange the transactions in slots, in case of encrypted transactions, and exploit the benefits of parallelism. In particular, the ordering node 450 assigns blocks of transactions with the quality key to a cluster 452, blocks of transactions with the payment key to cluster 454, and blocks of transactions with the shipment key to cluster 456. Here, all the transactions are encrypted but the ordering node knows the key clusters for each block.

According to various embodiments, the ordering node 450 can arrange the blocks in slots on a blockchain 460. In particular, one block from each of the clusters 442, 444, and 446, may be ordered in parallel on the same slot. Hence the maximum number of blocks in a slot can be equal to the number of key clusters. Here, the blocks are labeled with identifiers 462 to represent the key of the transactions stored therein. In this manner, transactions that are encrypted can still be arranged in slots. The keys are assigned on a transaction-basis by the transaction submitter. The ordering node 450 uses these keys to decide into which slot a block of transactions with same key should fall into.

Figure 5:
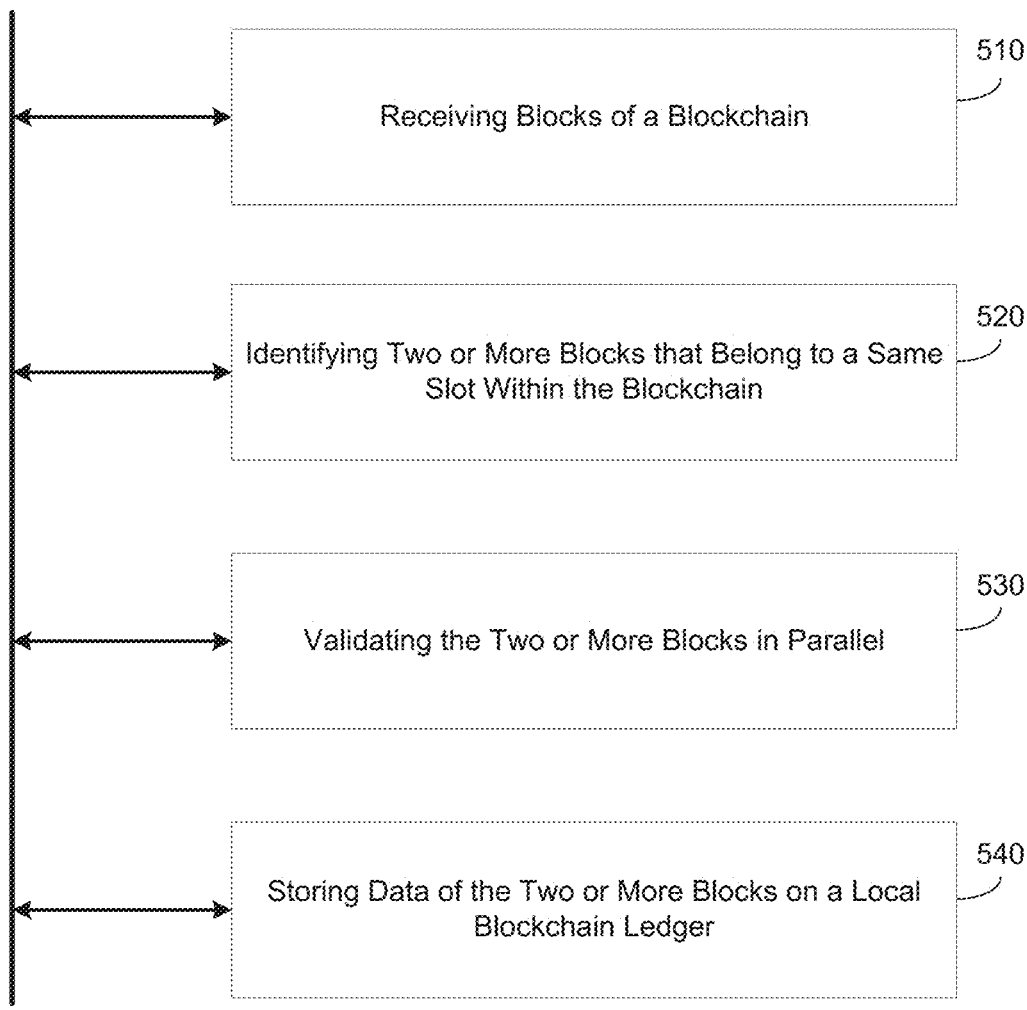
FIG. 5 is a diagram that illustrates a method of validating blocks in parallel according to example embodiments.

FIG. 5 illustrates a method 500 of validating blocks in parallel during a peer operation according to example embodiments. For example, the method 500 may be performed during a peer recovery operation, a peer start-up/boot operation, and the like. Referring to FIG. 5, in 510, the method may include receiving blocks of a blockchain from a neighboring blockchain peer. For example, the blocks may be received by a blockchain peer during a bootup process, a recovery process, a validation process, and the like. The neighboring peers may be included in a same blockchain network as the peer receiving the blocks. In some embodiments, when the blockchain peer is performing a recovery or boot-up operation, the method may further include initializing a local blockchain ledger during at least one of a bootup and recovery process.

In 520, the method may include identifying two or more blocks from among the received blocks that belong to a same slot within the blockchain. For example, the two or more blocks may include only transactions which are non-dependent with respect to transactions in the other blocks in the slot. For example, a first and a second block may be considered non-dependent blocks when none of the transactions in the first block are dependent on transactions in the second block, and vice versa. However, it is possible that transactions in the first block may be dependent on other transactions in the first block. Likewise, transactions in the second block may be dependent on other transactions in the second block. However, the transactions may not have inter-block dependencies.

In some embodiments, the identifying may include identifying which of the received blocks belong in the same slot based on hash values stored in the received blocks. In some embodiments, the identifying may include determining that a block belongs in a current slot when an immediate previous hash value of the block is a function of hashes of multiple blocks stored in an immediate previous slot on the blockchain.

In 530, the method may include validating the two or more identified blocks in parallel via execution of the two or more identified blocks at a same time. Furthermore, in 540, in response to validation of the two or more identified blocks, the method may include storing the two or more identified blocks on a local blockchain ledger of a blockchain peer. According to various embodiments, the validating may include simultaneously executing the two or more identified blocks in parallel (overlapping in time) on two or more independent processor cores of the blockchain peer.

In some embodiments, the method may further include identifying two or more other blocks on the blockchain which belong to an immediately previous slot. In this example, the method may further include validating the two more other blocks that belong to the immediately previous slot in parallel with the two or more identified blocks that belong to the same slot when the two or more other blocks are not dependent on the two or more identified blocks.

Figure 6A:
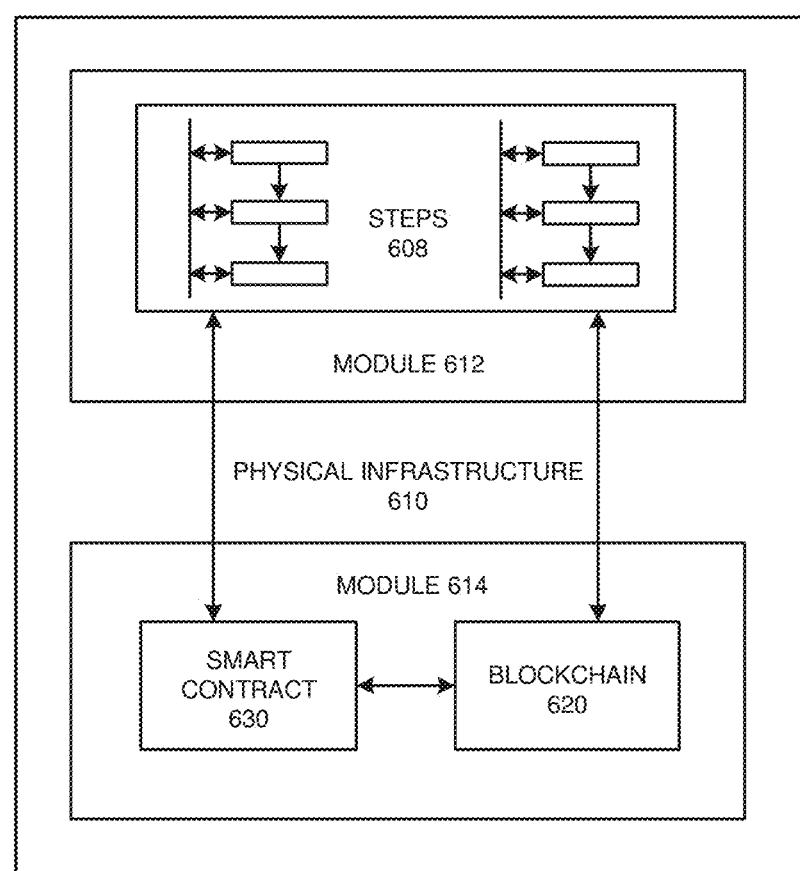
FIG. 6A is a diagram that illustrates an example system configured to perform one or more operations described herein, according to example embodiments.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
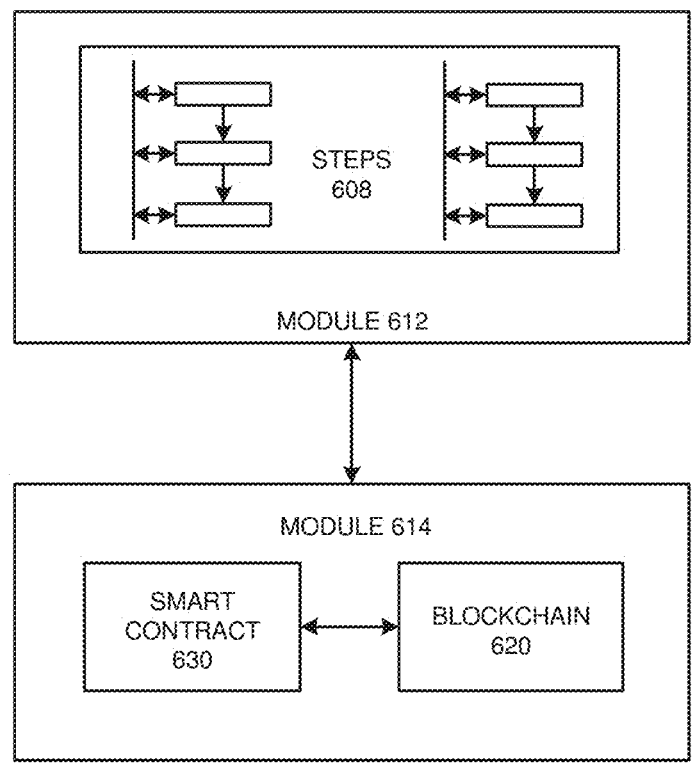
FIG. 6B is a diagram that illustrates another example system configured to perform one or more operations described herein, according to example embodiments.

FIG. 6B illustrates another example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
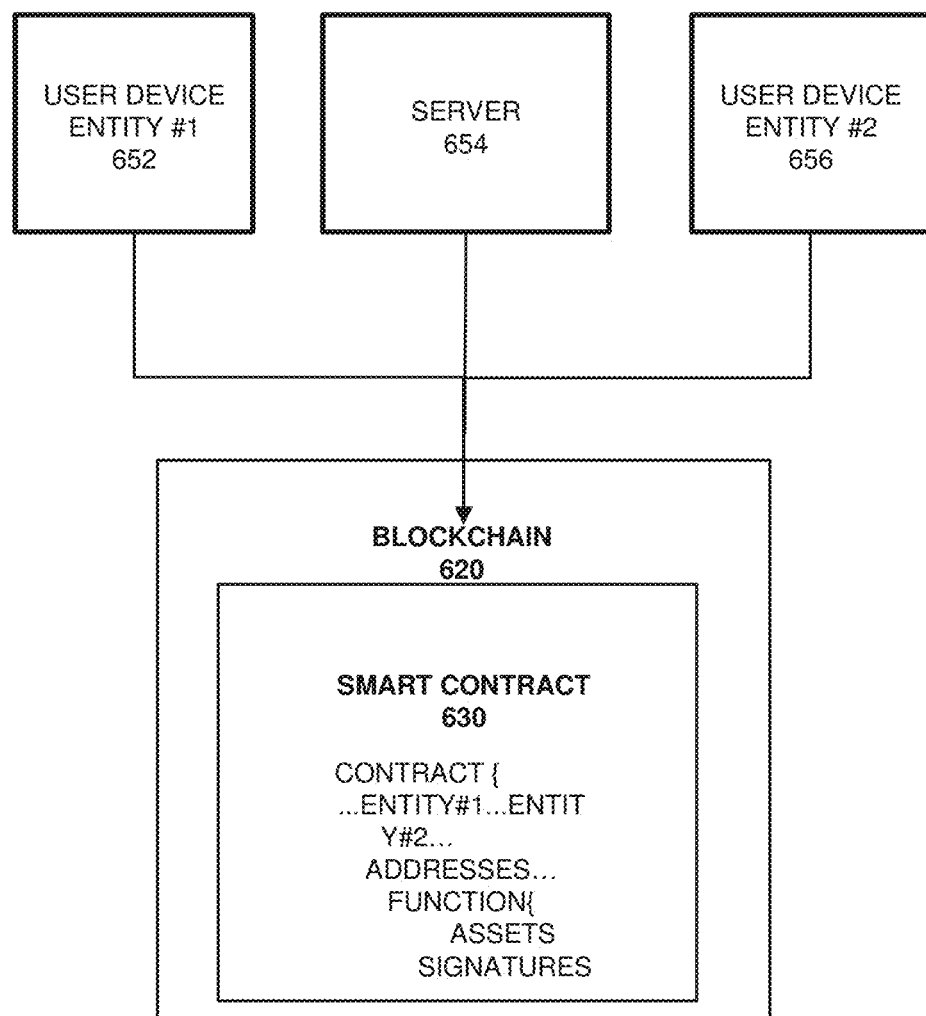
FIG. 6C is a diagram that illustrates a further example system configured to utilize a smart contract, according to example embodiments.

FIG. 6C illustrates an example system configured to utilize a smart contract configuration among contracting parties and a mediating server configured to enforce the smart contract terms on the blockchain according to example embodiments. Referring to FIG. 6C, the configuration 650 may represent a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
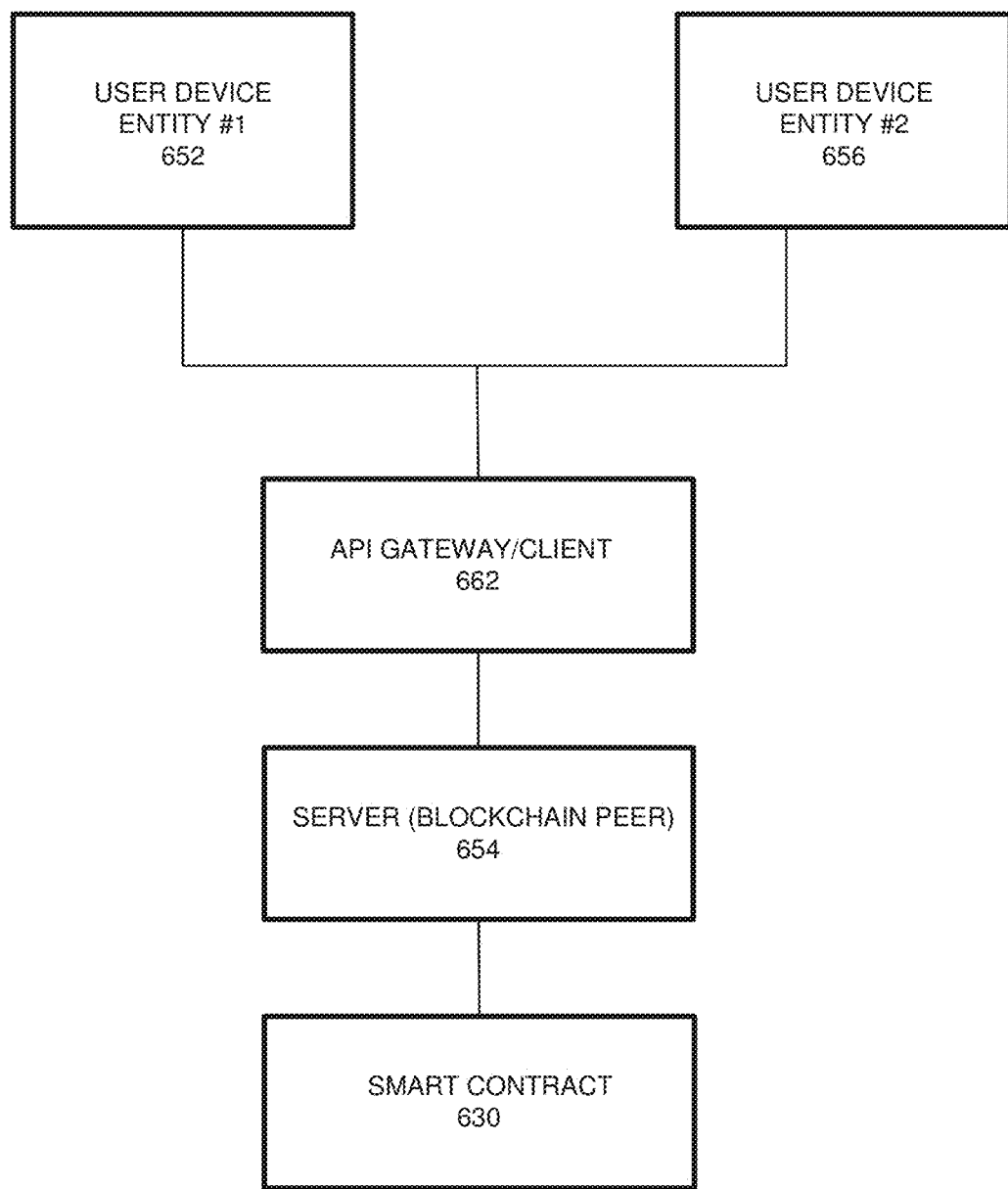
FIG. 6D is a diagram that illustrates yet another example system configured to utilize a blockchain, according to example embodiments.

FIG. 6D illustrates a system 660 including a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.). In this example, the API gateway 662 is a common interface for performing transactions (invoke, queries, etc.) on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit transactions into the blockchain network where, depending on the smart contract 630 and endorsement policy, endorsing peers will run the smart contracts 630.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 7A:
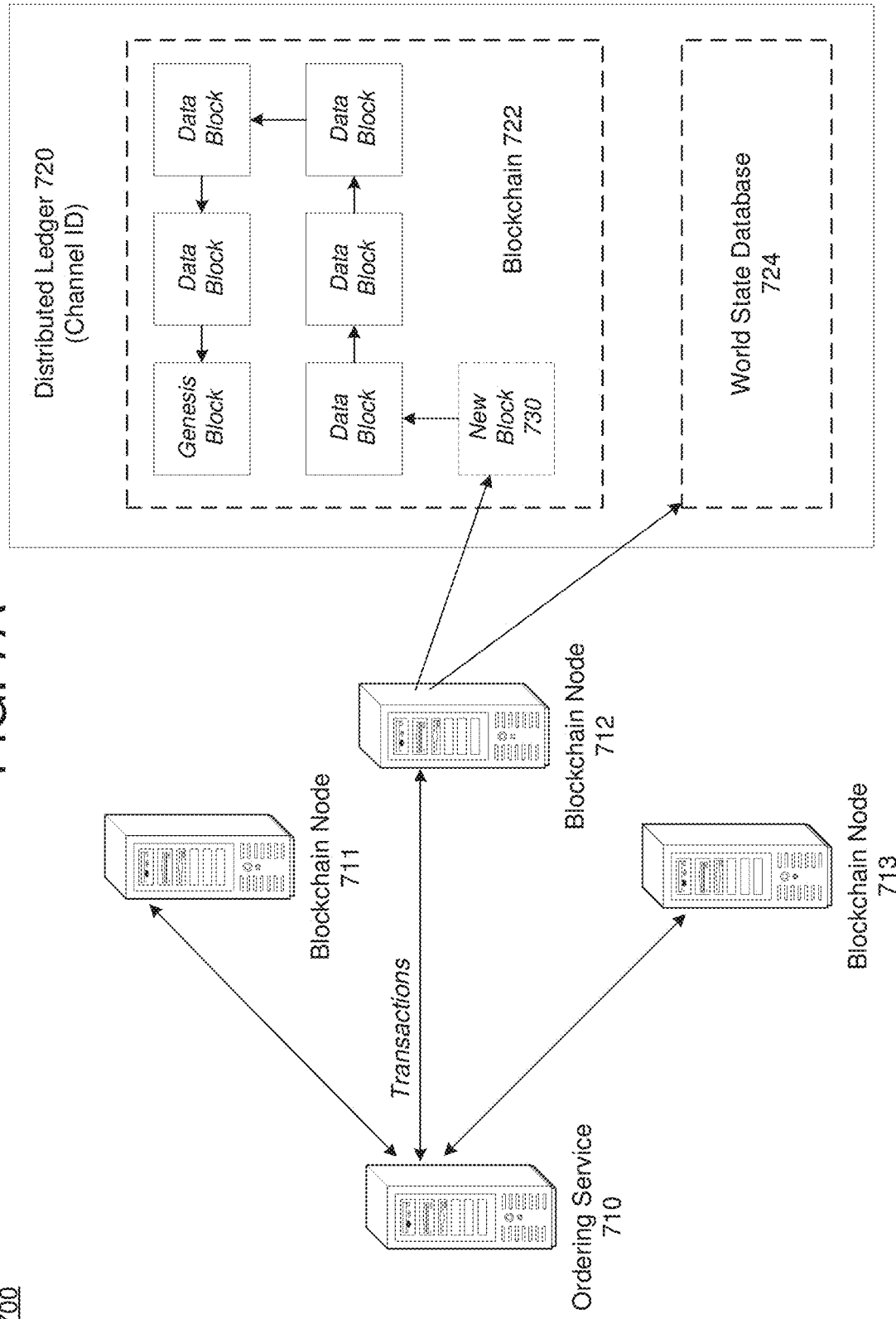
FIG. 7A is a diagram that illustrates a process of a new block being added to a distributed ledger, according to example embodiments.
Figure 7B:
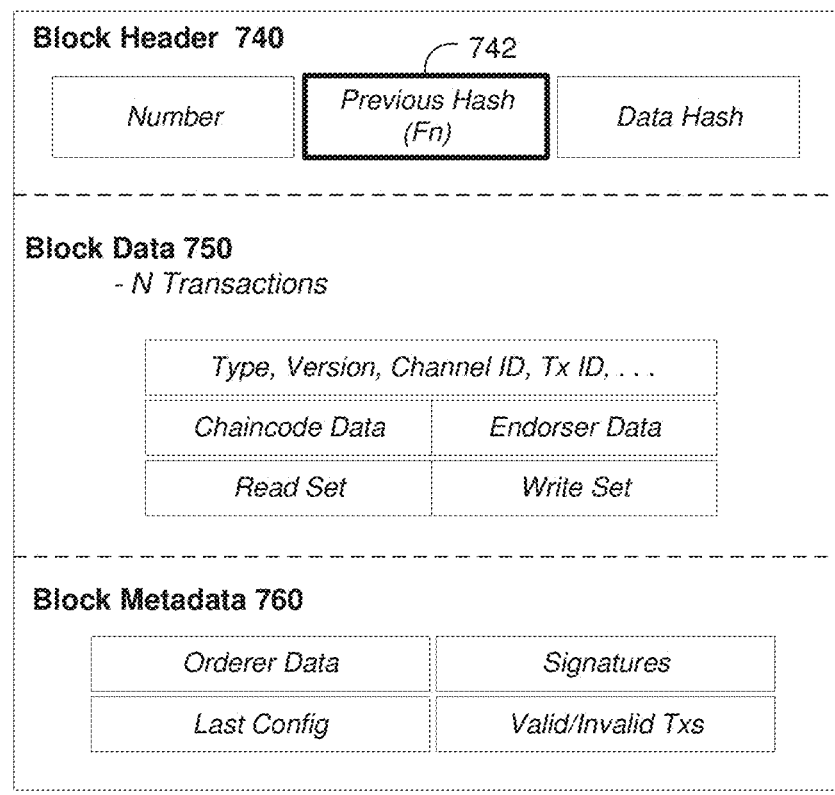
FIG. 7B is a diagram that illustrates contents of a new data block, according to example embodiments.

FIG. 7A illustrates a process 700 of a new block being added to a distributed ledger 720, according to example embodiments, and FIG. 7B illustrates contents of a new data block structure 730 for blockchain, according to example embodiments. Referring to FIG. 7A, clients (not shown) may submit transactions to blockchain nodes 711, 712, and/or 713. Clients may be instructions received from any source to enact activity on the blockchain 720. As an example, clients may be applications that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720. Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both.

The distributed ledger 720 includes a blockchain which stores immutable, sequenced records in blocks, and a state database 724 (current world state) maintaining a current state of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 722 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys are stored in the state database 724. The state database 724 may include an indexed view into the transaction log of the blockchain 722, it can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction". Different channels may have different endorsement policies. Endorsed transactions are forward by the client application to ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data new data block 730 for storage on blockchain 720. The first block in the blockchain may be referred to as a genesis block which includes information about the blockchain, its members, the data stored therein, etc.

The ordering service 710 may be made up of a cluster of orderers. The ordering service 710 does not process transactions, smart contracts, or maintain the shared ledger. Rather, the ordering service 710 may accept the endorsed transactions and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network.

When the ordering service 710 initializes a new data block 730, the new data block 730 may be broadcast to committing peers (e.g., blockchain nodes 711, 712, and 713). In response, each committing peer validates the transaction within the new data block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a new data block 730 (also referred to as a data block) that is stored on the blockchain 722 of the distributed ledger 720 may include multiple data segments such as a block header 740, block data 750, and block metadata 760. It should be appreciated that the various depicted blocks and their contents, such as new data block 730 and its contents shown in FIG. 7B are merely examples and are not meant to limit the scope of the example embodiments. The new data block 730 may store transactional information of N transaction(s) (e.g., 1, 10, 100, 500, 1000, 2000, 3000, etc.) within the block data 750.

According to various embodiments, the new data block 730 may include a link to a previous slot on the blockchain within the block header 740. In particular, the block header 740 may include a hash function 742 of a previous slot of blocks. In some embodiments, the hash function 742 may include an XOR of hashes of a set of blocks (or hashes of documents in the set of blocks) included in the immediately previous slot. As another example, the hash function 742 may include a compounding hash of hashes of a set of blocks (or hashes of documents in the set of blocks) included in a previous slot.

The block header 740 may also include a unique block number, a hash of the block data 750 of the new data block 730, and the like. The block number of the new data block 730 may be unique and assigned in various orders, such as an incremental/sequential order starting from zero.

The block data 750 may store transactional information of each transaction that is recorded within the new data block 730. For example, the transaction data may include one or more of a type of the transaction, a version, a timestamp, a channel ID of the distributed ledger 720, a transaction ID, an epoch, a payload visibility, a chaincode path, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkle tree query summary, and the like. The transaction data may be stored for each of the N transactions.

The block metadata 760 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committer of the block (such as blockchain node 712) may add validity/invalidity information based on an endorsement policy, verification of read/write sets, and the like. The transaction filter may include a byte array of a size equal to the number of transactions in the block data 750 and a validation code identifying whether a transaction was valid/invalid. In some embodiments, although not shown in FIG. 7B, the block metadata 760 may store metadata of the recommended smart contracts there within.

Figure 7C:
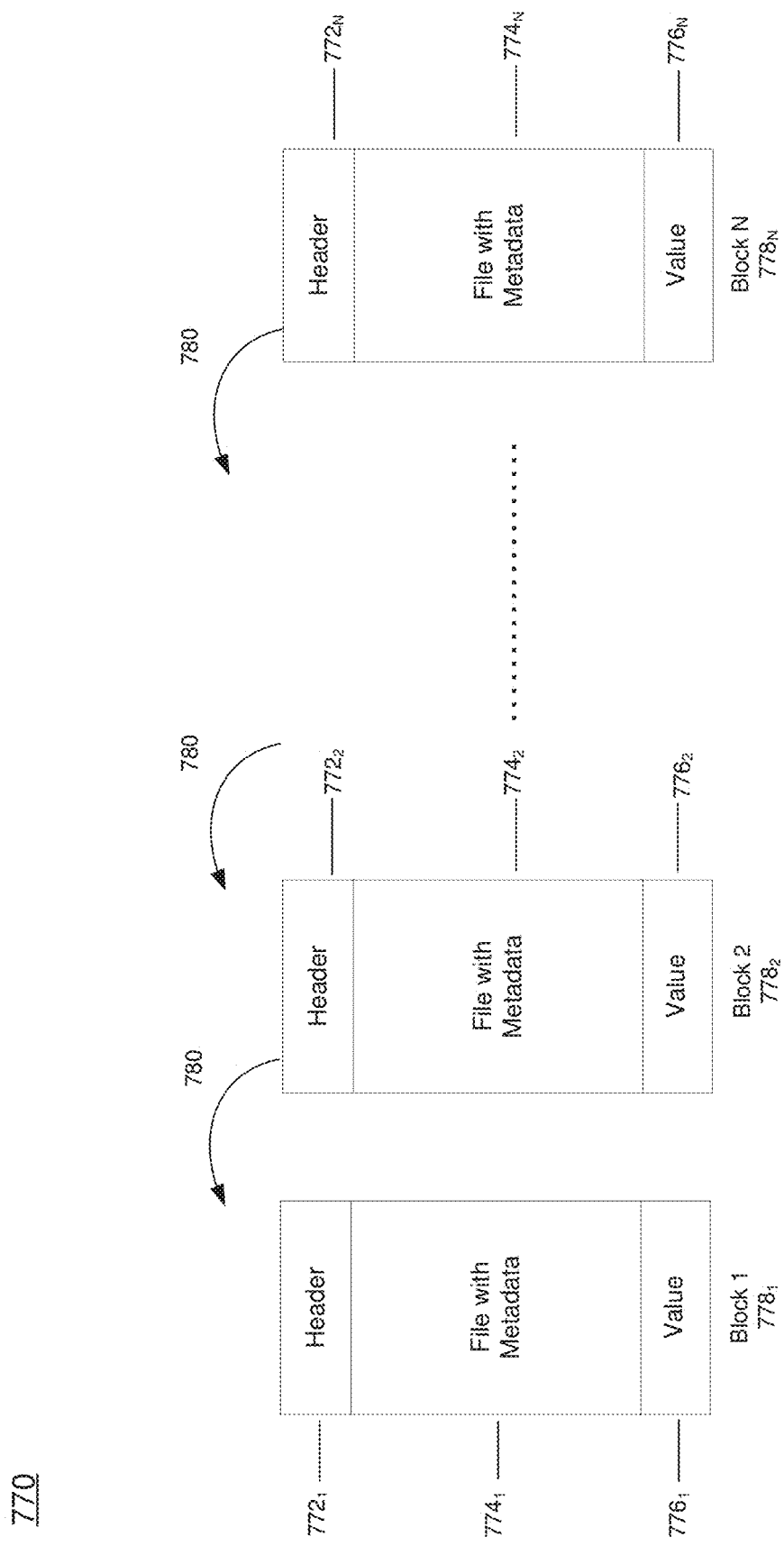
FIG. 7C is a diagram that illustrates a blockchain for digital content, according to example embodiments.

FIG. 7C illustrates an embodiment of a blockchain 770 for digital content in accordance with the embodiments described herein. The digital content may include one or more files and associated information. The files may include media, images, video, audio, text, links, graphics, animations, web pages, documents, or other forms of digital content. The immutable, append-only aspects of the blockchain serve as a safeguard to protect the integrity, validity, and authenticity of the digital content, making it suitable use in legal proceedings where admissibility rules apply or other settings where evidence is taken in to consideration or where the presentation and use of digital information is otherwise of interest. In this case, the digital content may be referred to as digital evidence.

The blockchain may be formed in various ways. In one embodiment, the digital content may be included in and accessed from the blockchain itself. For example, each block of the blockchain may store a hash value of reference information (e.g., header, value, etc.) along the associated digital content. The hash value and associated digital content may then be encrypted together. Thus, the digital content of each block may be accessed by decrypting each block in the blockchain, and the hash value of each block may be used as a basis to reference a previous block. This may be illustrated as follows:

| Block 1 | Block 2 | ... | Block N |
|---|---|---|---|
| Hash Value 1 | Hash Value 2 | | Hash Value N |
| Digital Content 1 | Digital Content 2 | | Digital Content N |

In one embodiment, the digital content may be not included in the blockchain. For example, the blockchain may store the encrypted hashes of the content of each block without any of the digital content. The digital content may be stored in another storage area or memory address in association with the hash value of the original file. The other storage area may be the same storage device used to store the blockchain or may be a different storage area or even a separate relational database. The digital content of each block may be referenced or accessed by obtaining or querying the hash value of a block of interest and then looking up that has value in the storage area, which is stored in correspondence with the actual digital content. This operation may be performed, for example, a database gatekeeper. This may be illustrated as follows:

| Blockchain | Storage Area |
|---|---|
| Block 1 Hash Value | Block 1 Hash Value . . . Content |
| . | . |
| . | . |
| . | . |
| Block N Hash Value | Block N Hash Value . . . Content |

In the example embodiment of FIG. 7C, the blockchain 770 includes a number of blocks $778_1$, $778_2$, . . . $778_N$ cryptographically linked in an ordered sequence, where N≥1. The encryption used to link the blocks $778_1$, $778_2$, . . . $778_N$ may be any of a number of keyed or un-keyed Hash functions. In one embodiment, the blocks $778_1$, $778_2$, . . . $778_N$ are subject to a hash function which produces n-bit alphanumeric outputs (where n is 256 or another number) from inputs that are based on information in the blocks. Examples of such a hash function include, but are not limited to, a SHA-type (SHA stands for Secured Hash Algorithm) algorithm, Merkle-Damgard algorithm, HAIFA algorithm, Merkle-tree algorithm, nonce-based algorithm, and a non-collision-resistant PRF algorithm. In another embodiment, the blocks $778_1$, $778_2$, . . . , $778_N$ may be cryptographically linked by a function that is different from a hash function. For purposes of illustration, the following description is made with reference to a hash function, e.g., SHA-2.

Each of the blocks $778_1$, $778_2$, . . . , $778_N$ in the blockchain includes a header, a version of the file, and a value. The header and the value are different for each block as a result of hashing in the blockchain. In one embodiment, the value may be included in the header. As described in greater detail below, the version of the file may be the original file or a different version of the original file.

The first block $778_1$ in the blockchain is referred to as the genesis block and includes the header $772_1$, original file $774_1$, and an initial value $776_1$. The hashing scheme used for the genesis block, and indeed in all subsequent blocks, may vary. For example, all the information in the first block $778_1$ may be hashed together and at one time, or each or a portion of the information in the first block $778_1$ may be separately hashed and then a hash of the separately hashed portions may be performed.

The header $772_1$ may include one or more initial parameters, which, for example, may include a version number, timestamp, nonce, root information, difficulty level, consensus protocol, duration, media format, source, descriptive keywords, and/or other information associated with original file $774_1$ and/or the blockchain. The header $772_1$ may be generated automatically (e.g., by blockchain network managing software) or manually by a blockchain participant. Unlike the header in other blocks $778_2$ to $778_N$ in the blockchain, the header $772_1$ in the genesis block does not reference a previous block, simply because there is no previous block.

The original file $774_1$ in the genesis block may be, for example, data as captured by a device with or without processing prior to its inclusion in the blockchain. The original file $774_1$ is received through the interface of the system from the device, media source, or node. The original file $774_1$ is associated with metadata, which, for example, may be generated by a user, the device, and/or the system processor, either manually or automatically. The metadata may be included in the first block $778_1$ in association with the original file $774_1$.

The value $776_1$ in the genesis block is an initial value generated based on one or more unique attributes of the original file $774_1$. In one embodiment, the one or more unique attributes may include the hash value for the original file $774_1$, metadata for the original file $774_1$, and other information associated with the file. In one implementation, the initial value $776_1$ may be based on the following unique attributes:

1) SHA-2 computed hash value for the original file
2) originating device ID
3) starting timestamp for the original file
4) initial storage location of the original file
5) blockchain network member ID for software to currently control the original file and associated metadata The other blocks $778_2$ to $778_N$ in the blockchain also have headers, files, and values. However, unlike the first block $772_1$, each of the headers $772_2$ to $772_N$ in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 780, to establish an auditable and immutable chain-of-custody.

Each of the header $772_2$ to $772_N$ in the other blocks may also include other information, e.g., version number, timestamp, nonce, root information, difficulty level, consensus protocol, and/or other parameters or information associated with the corresponding files and/or the blockchain in general.

The files $774_2$ to $774_N$ in the other blocks may be equal to the original file or may be a modified version of the original file in the genesis block depending, for example, on the type of processing performed. The type of processing performed may vary from block to block. The processing may involve, for example, any modification of a file in a preceding block, such as redacting information or otherwise changing the content of, taking information away from, or adding or appending information to the files.

Additionally, or alternatively, the processing may involve merely copying the file from a preceding block, changing a storage location of the file, analyzing the file from one or more preceding blocks, moving the file from one storage or memory location to another, or performing action relative to the file of the blockchain and/or its associated metadata. Processing which involves analyzing a file may include, for example, appending, including, or otherwise associating various analytics, statistics, or other information associated with the file.

The values in each of the other blocks $776_2$ to $776_N$ in the other blocks are unique values and are all different as a result of the processing performed. For example, the value in any one block corresponds to an updated version of the value in the previous block. The update is reflected in the hash of the block to which the value is assigned. The values of the blocks therefore provide an indication of what processing was performed in the blocks and also permit a tracing through the blockchain back to the original file. This tracking confirms the chain-of-custody of the file throughout the entire blockchain.

For example, consider the case where portions of the file in a previous block are redacted, blocked out, or pixelated in order to protect the identity of a person shown in the file. In this case, the block including the redacted file will include metadata associated with the redacted file, e.g., how the redaction was performed, who performed the redaction, timestamps where the redaction(s) occurred, etc. The metadata may be hashed to form the value. Because the metadata for the block is different from the information that was hashed to form the value in the previous block, the values are different from one another and may be recovered when decrypted.

Figure 7D:
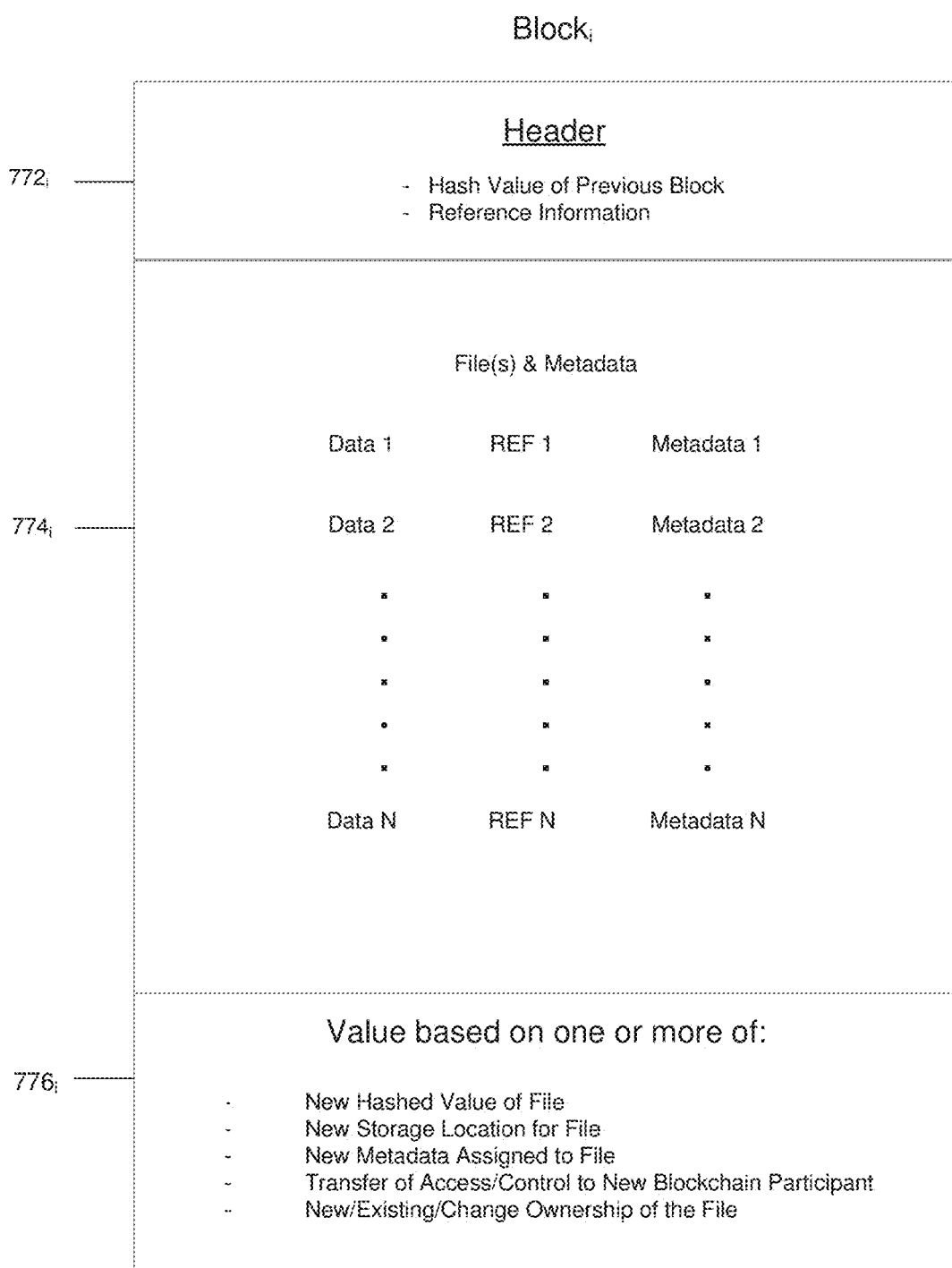
FIG. 7D is a diagram that illustrates a block which may represent the structure of blocks in the blockchain, according to example embodiments.

In one embodiment, the value of a previous block may be updated (e.g., a new hash value computed) to form the value of a current block when any one or more of the following occurs. The new hash value may be computed by hashing all or a portion of the information noted below, in this example embodiment.

a) new SHA-2 computed hash value if the file has been processed in any way (e.g., if the file was redacted, copied, altered, accessed, or some other action was taken)
b) new storage location for the file
c) new metadata identified associated with the file
d) transfer of access or control of the file from one blockchain participant to another blockchain participant FIG. 7D illustrates an embodiment of a block which may represent the structure of the blocks in the blockchain 790 in accordance with one embodiment. The block, $Block_i$, includes a header $772_i$, a file $774_i$, and a value $776_i$.

The header $772_i$ includes a hash value of a previous block $Block_{i-1}$ and additional reference information, which, for example, may be any of the types of information (e.g., header information including references, characteristics, parameters, etc.) discussed herein. All blocks reference the hash of a previous block except, of course, the genesis block. The hash value of the previous block may be just a hash of the header in the previous block or a hash of all or a portion of the information in the previous block, including the file and metadata.

The file $774_i$ includes a plurality of data, such as Data 1, Data 2, . . . , Data N in sequence. The data are tagged with metadata Metadata 1, Metadata 2, . . . , Metadata N which describe the content and/or characteristics associated with the data. For example, the metadata for each data may include information to indicate a timestamp for the data, process the data, keywords indicating the persons or other content depicted in the data, and/or other features that may be helpful to establish the validity and content of the file as a whole, and particularly its use a digital evidence, for example, as described in connection with an embodiment discussed below. In addition to the metadata, each data may be tagged with reference $REF_1$, $REF_2$, . . . , $REF_N$ to a previous data to prevent tampering, gaps in the file, and sequential reference through the file.

Once the metadata is assigned to the data (e.g., through a smart contract), the metadata cannot be altered without the hash changing, which can easily be identified for invalidation. The metadata, thus, creates a data log of information that may be accessed for use by participants in the blockchain.

The value $776_i$ is a hash value or other value computed based on any of the types of information previously discussed. For example, for any given block $Block_i$, the value for that block may be updated to reflect the processing that was performed for that block, e.g., new hash value, new storage location, new metadata for the associated file, transfer of control or access, identifier, or other action or information to be added. Although the value in each block is shown to be separate from the metadata for the data of the file and header, the value may be based, in part or whole, on this metadata in another embodiment.

Once the blockchain 770 is formed, at any point in time, the immutable chain-of-custody for the file may be obtained by querying the blockchain for the transaction history of the values across the blocks. This query, or tracking procedure, may begin with decrypting the value of the block that is most currently included (e.g., the last ($N^{th}$) block), and then continuing to decrypt the value of the other blocks until the genesis block is reached and the original file is recovered. The decryption may involve decrypting the headers and files and associated metadata at each block, as well.

Decryption is performed based on the type of encryption that took place in each block. This may involve the use of private keys, public keys, or a public key-private key pair. For example, when asymmetric encryption is used, blockchain participants or a processor in the network may generate a public key and private key pair using a predetermined algorithm. The public key and private key are associated with each other through some mathematical relationship. The public key may be distributed publicly to serve as an address to receive messages from other users, e.g., an IP address or home address. The private key is kept secret and used to digitally sign messages sent to other blockchain participants. The signature is included in the message so that the recipient can verify using the public key of the sender. This way, the recipient can be sure that only the sender could have sent this message.

Generating a key pair may be analogous to creating an account on the blockchain, but without having to actually register anywhere. Also, every transaction that is executed on the blockchain is digitally signed by the sender using their private key. This signature ensures that only the owner of the account can track and process (if within the scope of permission determined by a smart contract) the file of the blockchain.

Figure 8A:
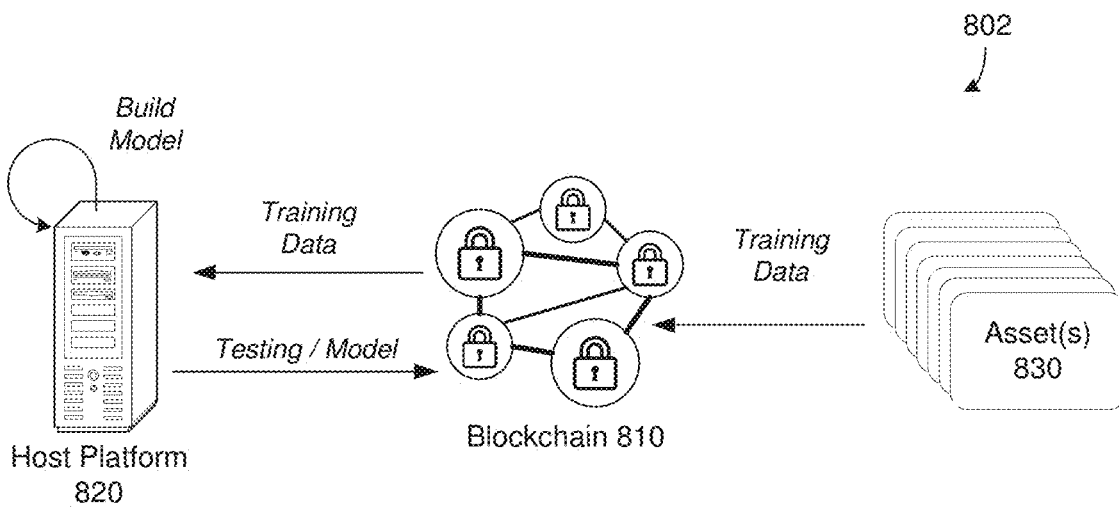
FIG. 8A is a diagram that illustrates an example blockchain which stores machine learning (artificial intelligence) data, according to example embodiments.
Figure 8A:
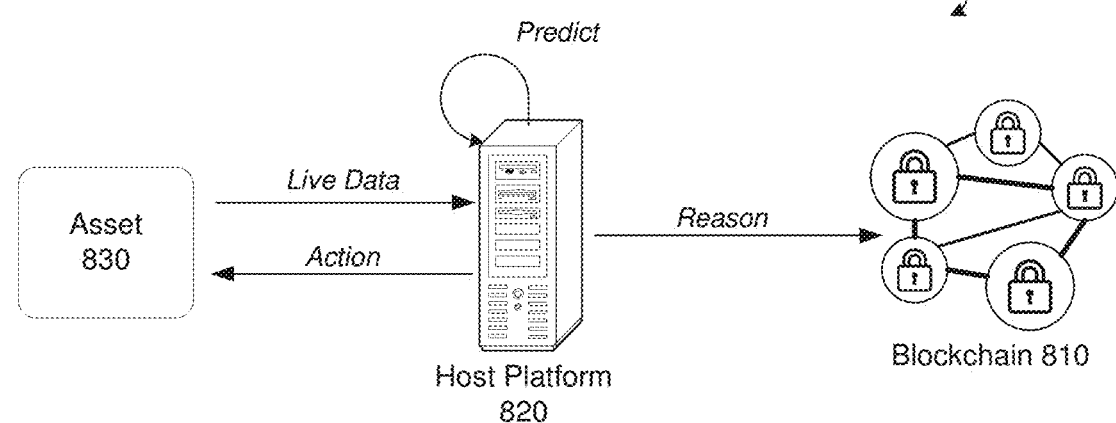
Figure 8B:
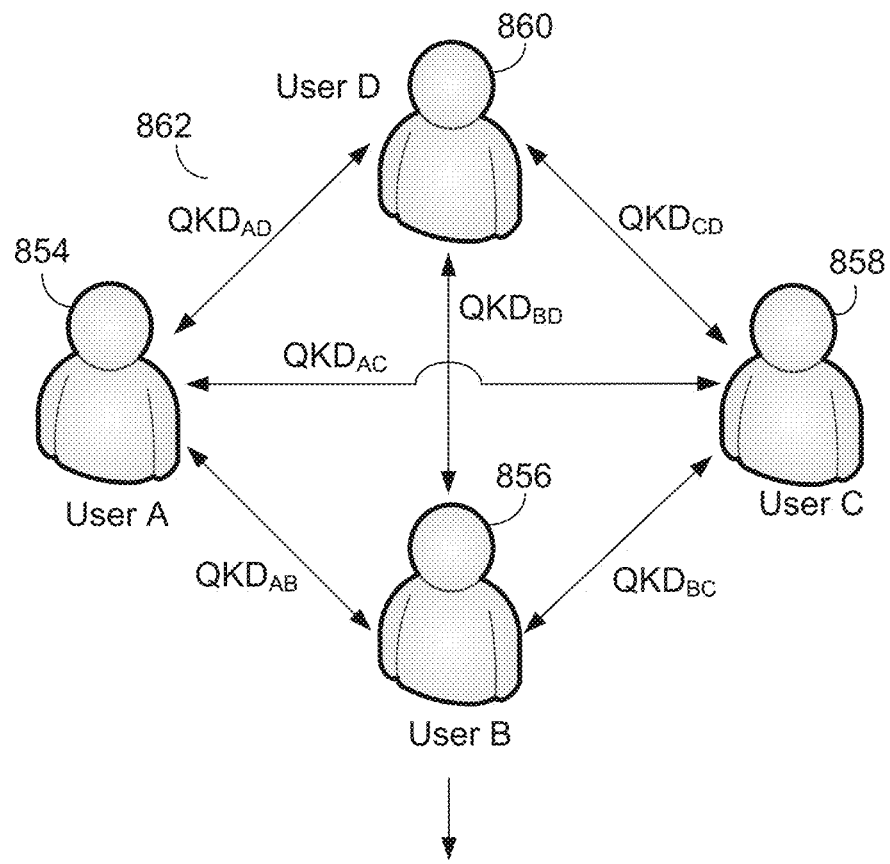
FIG. 8B is a diagram that illustrates an example quantum-secure blockchain, according to example embodiments.
Figure 8B:
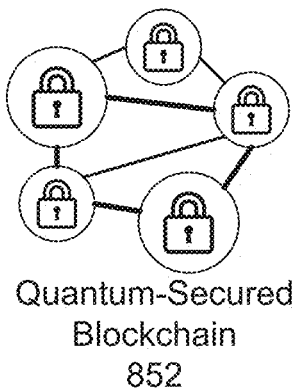

FIGS. 8A and 8B illustrate additional examples of use cases for blockchain which may be incorporated and used herein. In particular, FIG. 8A illustrates an example 800 of a blockchain 810 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 8A, a host platform 820 builds and deploys a machine learning model for predictive monitoring of assets 830. Here, the host platform 820 may be a cloud platform, an industrial server, a web server, a personal computer, a user device, and the like. Assets 830 can be any type of asset (e.g., machine or equipment, etc.) such as an aircraft, locomotive, turbine, medical machinery and equipment, oil and gas equipment, boats, ships, vehicles, and the like. As another example, assets 830 may be non-tangible assets such as stocks, currency, digital coins, insurance, or the like.

The blockchain 810 can be used to significantly improve both a training process 802 of the machine learning model and a predictive process 804 based on a trained machine learning model. For example, in 802, rather than requiring a data scientist/engineer or other user to collect the data, historical data may be stored by the assets 830 themselves (or through an intermediary, not shown) on the blockchain 810. This can significantly reduce the collection time needed by the host platform 820 when performing predictive model training. For example, using smart contracts, data can be directly and reliably transferred straight from its place of origin to the blockchain 810. By using the blockchain 810 to ensure the security and ownership of the collected data, smart contracts may directly send the data from the assets to the individuals that use the data for building a machine learning model. This allows for sharing of data among the assets 830.

The collected data may be stored in the blockchain 810 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure. Adding IoT devices which write directly to the blockchain can, in certain cases (i.e. supply chain, healthcare, logistics, etc.), increase both the frequency and accuracy of the data being recorded.

Furthermore, training of the machine learning model on the collected data may take rounds of refinement and testing by the host platform 820. Each round may be based on additional data or data that was not previously considered to help expand the knowledge of the machine learning model. In 802, the different training and testing steps (and the data associated therewith) may be stored on the blockchain 810 by the host platform 820. Each refinement of the machine learning model (e.g., changes in variables, weights, etc.) may be stored on the blockchain 810. This provides verifiable proof of how the model was trained and what data was used to train the model. Furthermore, when the host platform 820 has achieved a finally trained model, the resulting model may be stored on the blockchain 810.

After the model has been trained, it may be deployed to a live environment where it can make predictions/decisions based on the execution of the final trained machine learning model. For example, in 804, the machine learning model may be used for condition-based maintenance (CBM) for an asset such as an aircraft, a wind turbine, a healthcare machine, and the like. In this example, data fed back from the asset 830 may be input the machine learning model and used to make event predictions such as failure events, error codes, and the like. Determinations made by the execution of the machine learning model at the host platform 820 may be stored on the blockchain 810 to provide auditable/verifiable proof. As one non-limiting example, the machine learning model may predict a future breakdown/failure to a part of the asset 830 and create alert or a notification to replace the part. The data behind this decision may be stored by the host platform 820 on the blockchain 810. In one embodiment the features and/or the actions described and/or depicted herein can occur on or with respect to the blockchain 810.

New transactions for a blockchain can be gathered together into a new block and added to an existing hash value. This is then encrypted to create a new hash for the new block. This is added to the next list of transactions when they are encrypted, and so on. The result is a chain of blocks that each contain the hash values of all preceding blocks. Computers that store these blocks regularly compare their hash values to ensure that they are all in agreement. Any computer that does not agree, discards the records that are causing the problem. This approach is good for ensuring tamper-resistance of the blockchain, but it is not perfect.

One way to game this system is for a dishonest user to change the list of transactions in their favor, but in a way that leaves the hash unchanged. This can be done by brute force, in other words by changing a record, encrypting the result, and seeing whether the hash value is the same. And if not, trying again and again and again until it finds a hash that matches. The security of blockchains is based on the belief that ordinary computers can only perform this kind of brute force attack over time scales that are entirely impractical, such as the age of the universe. By contrast, quantum computers are much faster (1000s of times faster) and consequently pose a much greater threat.

FIG. 8B illustrates an example 850 of a quantum-secure blockchain 852 which implements quantum key distribution (QKD) to protect against a quantum computing attack. In this example, blockchain users can verify each other's identities using QKD. This sends information using quantum particles such as photons, which cannot be copied by an eavesdropper without destroying them. In this way, a sender and a receiver through the blockchain can be sure of each other's identity.

In the example of FIG. 8B, four users are present 854, 856, 858, and 860. Each of pair of users may share a secret key 862 (i.e., a QKD) between themselves. Since there are four nodes in this example, six pairs of nodes exists, and therefore six different secret keys 862 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the blockchain 852 is based on two procedures (i) creation of transactions, and (ii) construction of blocks that aggregate the new transactions. New transactions may be created similar to a traditional blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 854-860) authenticate the transaction by providing their shared secret key 862 (QKD). This quantum signature can be attached to every transaction making it exceedingly difficult to tamper with. Each node checks their entries with respect to a local copy of the blockchain 852 to verify that each transaction has sufficient funds. However, the transactions are not yet confirmed.

Rather than perform a traditional mining process on the blocks, the blocks may be created in a decentralized manner using a broadcast protocol. At a predetermined period of time (e.g., seconds, minutes, hours, etc.) the network may apply the broadcast protocol to any unconfirmed transaction thereby to achieve a Byzantine agreement (consensus) regarding a correct version of the transaction. For example, each node may possess a private value (transaction data of that particular node). In a first round, nodes transmit their private values to each other. In subsequent rounds, nodes communicate the information they received in the previous round from other nodes. Here, honest nodes are able to create a complete set of transactions within a new block. This new block can be added to the blockchain 852. In one embodiment the features and/or the actions described and/or depicted herein can occur on or with respect to the blockchain 852.

Figure 9:
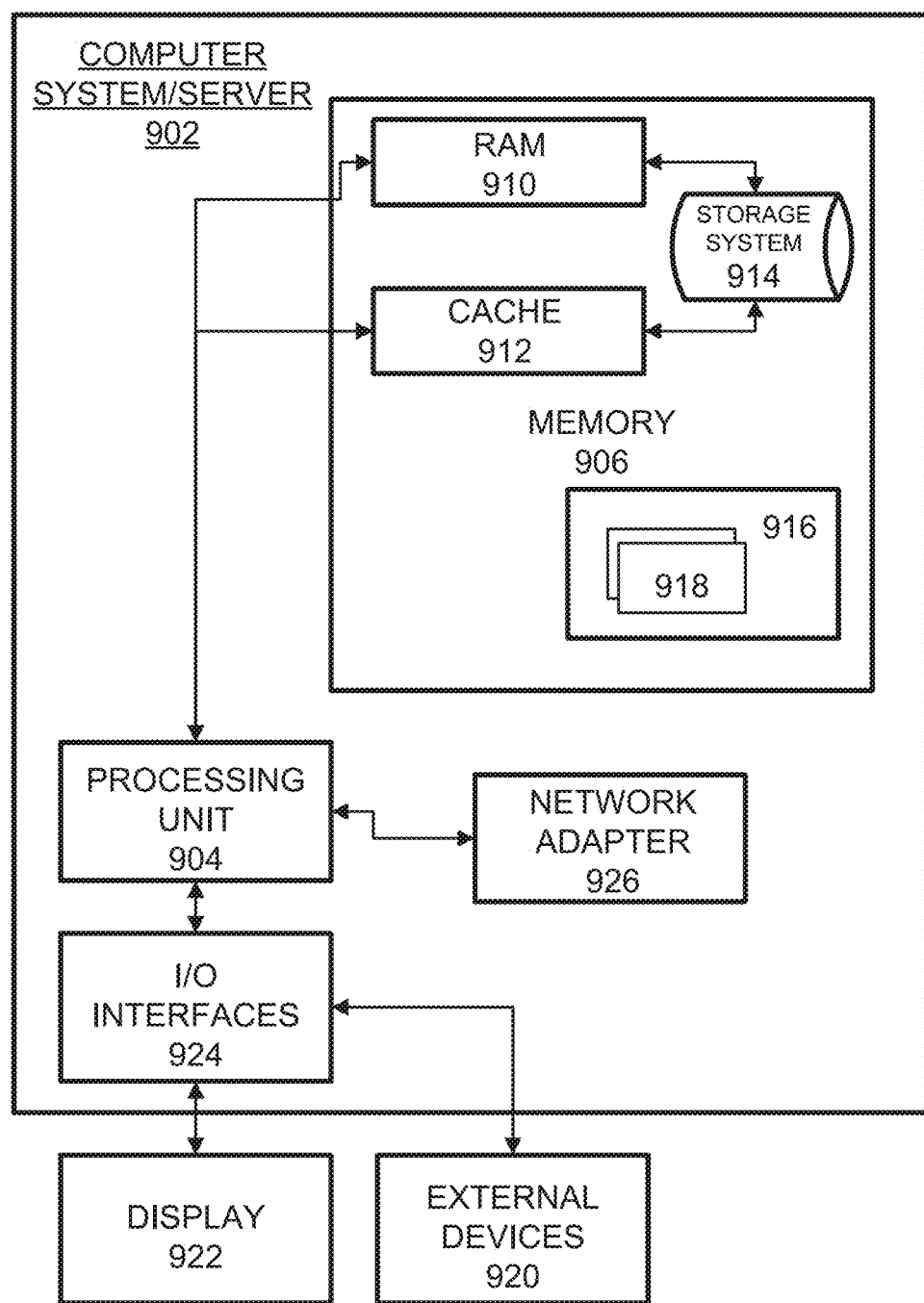
FIG. 9 is a diagram that illustrates an example system that supports one or more of the example embodiments.

FIG. 9 illustrates an example system 900 that supports one or more of the example embodiments described and/or depicted herein. The system 900 comprises a computer system/server 902, which is operational with numerous other general purpose or special purpose computing system environments or configurations. Examples of well-known computing systems, environments, and/or configurations that may be suitable for use with computer system/server 902 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 902 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 902 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 902 in cloud computing node 900 is shown in the form of a general-purpose computing device. The components of computer system/server 902 may include, but are not limited to, one or more processors or processing units 904, a system memory 906, and a bus that couples various system components including system memory 906 to processor 904.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 902 typically includes a variety of computer system readable media. Such media may be any available media that is accessible by computer system/server 902, and it includes both volatile and non-volatile media, removable and non-removable media. System memory 906, in one embodiment, implements the flow diagrams of the other figures. The system memory 906 can include computer system readable media in the form of volatile memory, such as random-access memory (RAM) 910 and/or cache memory 912. Computer system/server 902 may further include other removable/non-removable, volatile/non-volatile computer system storage media. By way of example only, storage system 914 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 906 may include at least one program product having a set (e.g., at least one) of program modules that are configured to carry out the functions of various embodiments of the application.

Program/utility 916, having a set (at least one) of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 918 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 902 may also communicate with one or more external devices 920 such as a keyboard, a pointing device, a display 922, etc.; one or more devices that enable a user to interact with computer system/server 902; and/or any devices (e.g., network card, modem, etc.) that enable computer system/server 902 to communicate with one or more other computing devices. Such communication can occur via I/O interfaces 924. Still yet, computer system/server 902 can communicate with one or more networks such as a local area network (LAN), a general wide area network (WAN), and/or a public network (e.g., the Internet) via network adapter 926. As depicted, network adapter 926 communicates with the other components of computer system/server 902 via a bus. It should be understood that although not shown, other hardware and/or software components could be used in conjunction with computer system/server 902. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus comprising:
   a network interface configured to receive blocks of a blockchain from one or more of a neighboring blockchain peer and an ordering service node; and
   a processor configured to identify two or more blocks from among the received blocks that belong to a same slot within the blockchain, validate the two or more identified blocks in parallel via execution of the two or more identified blocks at a same time, and in response to validation of the two or more identified blocks, store the two or more identified blocks on a local blockchain ledger of a blockchain peer;
   wherein two or more blocks that belong to an immediately previous slot in parallel are validated with the two or more identified blocks that belong to the same slot when two or more other blocks are not dependent on the two or more identified blocks.

2. The apparatus of claim 1, wherein the two or more identified blocks that belong to the same slot are non-dependent blocks with respect to each other.

3. The apparatus of claim 1, wherein the processor is configured to simultaneously execute the two or more identified blocks in parallel on two or more independent processor cores of the blockchain peer.

4. The apparatus of claim 1, wherein the processor is further configured to initialize the local blockchain ledger for at least one of a bootup and recovery process.

5. The apparatus of claim 1, wherein the processor is further configured to identify the two or more other blocks on the blockchain which belong to the immediately previous slot.

6. The apparatus of claim 1, wherein the processor is configured to identify which of the received blocks belong in the same slot based on hash values stored in the received blocks.

7. The apparatus of claim 1, wherein the processor determines that a block belongs in a current slot when an immediate previous hash value of the block is a function of hashes of multiple blocks stored in an immediate previous slot on the blockchain.

8. A method comprising:
   receiving blocks of a blockchain from one or more of a neighboring blockchain peer and an ordering service node;
   identifying two or more blocks from among the received blocks that belong to a same slot within the blockchain;
   validating the two or more identified blocks in parallel via execution of the two or more identified blocks at a same time; and
   in response to validation of the two or more identified blocks, storing the two or more identified blocks on a local blockchain ledger of a blockchain peer;
   wherein two or more blocks that belong to an immediately previous slot in parallel are validated with the two or more identified blocks that belong to the same slot when two or more other blocks are not dependent on the two or more identified blocks.

9. The method of claim 8, wherein the two or more identified blocks that belong to the same slot are non-dependent blocks with respect to each other.

10. The method of claim 8, wherein the validating comprises simultaneously executing the two or more identified blocks in parallel on two or more independent processor cores of the blockchain peer.

11. The method of claim 8, further comprising initializing the local blockchain ledger during at least one of a bootup and recovery process.

12. The method of claim 8, further comprising identifying the two or more other blocks on the blockchain which belong to the immediately previous slot.

13. The method of claim 8, wherein the identifying comprises identifying which of the received blocks belong in the same slot based on hash values stored in the received blocks.

14. The method of claim 8, wherein the identifying comprises determining that a block belongs in a current slot when an immediate previous hash value of the block is a function of hashes of multiple blocks stored in an immediate previous slot on the blockchain.

15. A non-transitory computer-readable medium comprising instructions, that when read by a processor, cause the processor to perform a method comprising:
   receiving blocks of a blockchain from one or more of a neighboring blockchain peer and an ordering service node;
   identifying two or more blocks from among the received blocks that belong to a same slot within the blockchain;
   validating the two or more identified blocks in parallel via execution of the two or more identified blocks at a same time; and
   in response to validation of the two or more identified blocks, storing the two or more identified blocks on a local blockchain ledger of a blockchain peer;
   wherein two or more blocks that belong to an immediately previous slot in parallel are validated with the two or more identified blocks that belong to the same slot when two or more other blocks are not dependent on the two or more identified blocks.

16. The non-transitory computer-readable medium of claim 15, wherein the two or more identified blocks that belong to the same slot are non-dependent blocks with respect to each other.

17. The non-transitory computer-readable medium of claim 15, wherein the validating comprises simultaneously executing the two or more identified blocks in parallel on two or more independent processor cores of the blockchain peer.

18. The non-transitory computer-readable medium of claim 15, wherein the method further comprises initializing the local blockchain ledger during at least one of a bootup and recovery process.

\* \* \* \* \*